US011306218B2

(12) United States Patent
Niederst et al.

(10) Patent No.: US 11,306,218 B2
(45) Date of Patent: Apr. 19, 2022

(54) CONTAINER COATING SYSTEM

(71) Applicant: SWIMC LLC, Cleveland, OH (US)

(72) Inventors: Jeffrey Niederst, Pittsburgh, PA (US); Richard H. Evans, Wexford, PA (US); Robert M. O'Brien, Monongahela, PA (US); Kevin Romagnoli, Coraopolis, PA (US); Mark S. Von Maier, Harmony, PA (US); Mary E. Tishey, Valencia, PA (US); Gregory M. Paulson, Slippery Rock, PA (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 16/713,764

(22) Filed: Dec. 13, 2019

(65) Prior Publication Data
US 2020/0115582 A1 Apr. 16, 2020

Related U.S. Application Data

(63) Continuation of application No. 14/418,040, filed as application No. PCT/US2013/032648 on Mar. 15, 2013, now Pat. No. 10,526,502.

(60) Provisional application No. 61/681,590, filed on Aug. 9, 2012.

(51) Int. Cl.
C09D 127/06 (2006.01)
C09D 5/00 (2006.01)
C08G 65/48 (2006.01)
C09D 5/08 (2006.01)
C09D 171/00 (2006.01)
C08G 59/06 (2006.01)
C09D 171/12 (2006.01)
B65D 23/02 (2006.01)
B65D 25/14 (2006.01)
B65D 85/00 (2006.01)
C09D 163/00 (2006.01)
C09D 167/00 (2006.01)
B05D 7/22 (2006.01)
B05D 7/00 (2006.01)

(52) U.S. Cl.
CPC ........... *C09D 127/06* (2013.01); *B65D 23/02* (2013.01); *B65D 25/14* (2013.01); *B65D 85/70* (2013.01); *C08G 59/063* (2013.01); *C08G 59/066* (2013.01); *C08G 65/485* (2013.01); *C09D 5/002* (2013.01); *C09D 5/08* (2013.01); *C09D 163/00* (2013.01); *C09D 167/00* (2013.01); *C09D 171/00* (2013.01); *C09D 171/12* (2013.01); *B05D 7/227* (2013.01); *B05D 7/544* (2013.01); *B05D 2202/00* (2013.01); *C08G 2650/56* (2013.01); *Y10T 428/1379* (2015.01); *Y10T 428/31786* (2015.04)

(58) Field of Classification Search
CPC .. C09D 127/00; C09D 167/00; C09D 163/00; B65D 23/02; B65D 25/14
See application file for complete search history.

(56) References Cited

U.S. PATENT DOCUMENTS

| | | | |
|---|---|---|---|
| 2,500,449 A | 3/1950 | Bradley | |
| 2,528,933 A | 11/1950 | Wiles | |
| 2,633,458 A | 3/1953 | Shokal | |
| 3,085,992 A | 4/1963 | Lee et al. | |
| 3,102,043 A | 8/1963 | Arthur et al. | |
| 3,153,008 A | 10/1964 | Fox | |
| 3,220,974 A | 11/1965 | Fox | |
| 3,275,601 A | 9/1966 | Schnell et al. | |
| 3,288,884 A | 11/1966 | Sonnabend et al. | |
| 3,313,775 A | 4/1967 | Frankel | |
| 3,379,684 A | 4/1968 | Wiesner et al. | |
| 3,383,008 A * | 5/1968 | Lipske | B65D 17/4011 220/270 |
| 3,475,266 A | 10/1969 | Strassel et al. | |
| 3,477,990 A | 11/1969 | Dante et al. | |
| 3,480,695 A | 11/1969 | Hale et al. | |
| 3,491,111 A | 1/1970 | Lin | |
| 3,491,112 A | 1/1970 | Lin | |
| 3,491,116 A | 1/1970 | Lin | |
| 3,509,174 A | 4/1970 | Lin | |
| 3,578,615 A | 5/1971 | Moore et al. | |
| 3,624,107 A | 11/1971 | Lin | |
| 3,627,787 A | 12/1971 | Lin | |
| 3,641,011 A | 2/1972 | Lin et al. | |
| 3,642,828 A | 2/1972 | Farber et al. | |

(Continued)

FOREIGN PATENT DOCUMENTS

CA 2280409 A1 2/2001
CA 2570312 A1 1/2006
(Continued)

OTHER PUBLICATIONS

Application and File History for U.S. Appl. No. 13/651,796, filed Oct. 15, 2012, 68 pages, Inventors: Evans, et al.
(Continued)

*Primary Examiner* — Kuo Liang Peng
(74) *Attorney, Agent, or Firm* — Patterson Thuente Pedersen, P.A.

(57) ABSTRACT

A multi-coat coating system having an undercoat composition and an overcoat composition, wherein the undercoat, overcoat or both the undercoat and overcoat contain a polymer having segments of a specified formula and are substantially free of polyhydric phenols having estrogenic activity greater than or equal to that of bisphenol S. The coating system is suitable for use on a food-contact surface of food or beverage containers.

32 Claims, No Drawings

(56) References Cited

U.S. PATENT DOCUMENTS

| | | |
|---|---|---|
| 3,681,390 A | 8/1972 | Lin |
| 3,775,424 A | 11/1973 | Farber |
| 3,853,869 A | 12/1974 | Farber |
| 3,876,606 A | 4/1975 | Kehr |
| 3,879,348 A | 4/1975 | Serini et al. |
| 3,888,812 A | 6/1975 | Plettner |
| 3,905,926 A | 9/1975 | D'Alelio |
| 3,920,510 A | 11/1975 | Hatano et al. |
| 3,959,571 A | 5/1976 | Yahagi et al. |
| RE28,862 E | 6/1976 | Siemonsen et al. |
| 3,971,808 A | 7/1976 | Baumann et al. |
| 3,984,363 A | 10/1976 | D'Alelio |
| 4,009,224 A | 2/1977 | Warnken |
| 4,011,184 A | 3/1977 | Van Reijendam et al. |
| 4,051,195 A | 9/1977 | McWhorter |
| 4,076,764 A | 2/1978 | Bauer |
| 4,111,910 A | 9/1978 | Baggett |
| 4,122,060 A | 10/1978 | Yallourakis |
| 4,172,103 A | 10/1979 | Cohen et al. |
| 4,173,594 A | 11/1979 | Dyszlewski |
| 4,212,781 A | 7/1980 | Evans et al. |
| 4,283,428 A | 8/1981 | Birkmeyer |
| 4,285,847 A | 8/1981 | Ting |
| 4,333,809 A | 6/1982 | Schreckenberg et al. |
| 4,340,716 A * | 7/1982 | Hata ............... C08G 59/04 525/384 |
| 4,368,315 A | 1/1983 | Sikdar |
| 4,374,233 A | 2/1983 | Loucks et al. |
| 4,399,241 A | 8/1983 | Ting et al. |
| 4,413,015 A | 11/1983 | Anderson et al. |
| 4,446,258 A | 5/1984 | Chu et al. |
| 4,468,483 A | 8/1984 | Yeakey et al. |
| 4,476,262 A | 10/1984 | Chu et al. |
| 4,487,861 A | 12/1984 | Winner |
| 4,510,513 A | 4/1985 | Yamaguchi et al. |
| 4,517,322 A | 5/1985 | Birkmeyer et al. |
| 4,522,984 A | 6/1985 | Watanabe et al. |
| 4,552,814 A | 11/1985 | Cavitt et al. |
| 4,564,655 A | 1/1986 | Liu |
| 4,600,737 A | 7/1986 | Georgalas et al. |
| 4,611,036 A | 9/1986 | Sekiguchi et al. |
| 4,622,368 A | 11/1986 | Verbicky, Jr. et al. |
| 4,647,612 A | 3/1987 | Ranka et al. |
| 4,665,149 A | 5/1987 | Bertram et al. |
| 4,707,534 A | 11/1987 | Schultz |
| 4,729,983 A | 3/1988 | Satake et al. |
| 4,757,132 A | 7/1988 | Brunelle et al. |
| 4,794,102 A | 12/1988 | Petersen et al. |
| 4,794,156 A | 12/1988 | Ho et al. |
| 4,806,597 A | 2/1989 | Gallucci et al. |
| 4,849,502 A | 7/1989 | Evans et al. |
| 4,880,892 A | 11/1989 | Urano et al. |
| 4,963,602 A | 10/1990 | Patel |
| 4,994,217 A | 2/1991 | Banevicius et al. |
| 5,010,147 A | 4/1991 | Westeppe et al. |
| 5,068,284 A | 11/1991 | Ullman et al. |
| 5,080,961 A | 1/1992 | Macy et al. |
| 5,102,608 A | 4/1992 | Frencken et al. |
| 5,115,082 A | 5/1992 | Mercer et al. |
| 5,162,406 A | 11/1992 | Meyer et al. |
| 5,201,436 A | 4/1993 | Owens et al. |
| 5,212,241 A | 5/1993 | Woo et al. |
| 5,288,839 A | 2/1994 | Greco |
| 5,296,525 A | 3/1994 | Spencer |
| 5,446,009 A | 8/1995 | Minami et al. |
| 5,494,950 A | 2/1996 | Asakage et al. |
| 5,496,921 A | 3/1996 | Sakashita et al. |
| 5,527,840 A | 6/1996 | Chutko et al. |
| 5,567,781 A | 10/1996 | Martino et al. |
| 5,576,413 A | 11/1996 | Bussink et al. |
| 5,591,788 A | 1/1997 | Anderson et al. |
| 5,623,031 A | 4/1997 | Imura et al. |
| 5,677,398 A | 10/1997 | Motoshima et al. |
| 5,686,185 A | 11/1997 | Correll et al. |
| 5,718,352 A | 2/1998 | Diekhoff et al. |
| 5,718,353 A | 2/1998 | Kanfer et al. |
| 5,803,301 A | 9/1998 | Sato et al. |
| 5,807,912 A | 9/1998 | Wu et al. |
| 5,811,498 A | 9/1998 | Perumal et al. |
| 5,830,952 A | 11/1998 | Pedersen et al. |
| 5,859,172 A | 1/1999 | Sakashita et al. |
| 5,880,248 A | 3/1999 | Sakashita et al. |
| 5,916,933 A | 6/1999 | Johnson et al. |
| 5,922,817 A | 7/1999 | Pedersen et al. |
| 5,925,694 A | 7/1999 | Stengel-Rutkowski et al. |
| 5,994,462 A | 11/1999 | Srinivasan et al. |
| 6,008,273 A | 12/1999 | Leibelt et al. |
| 6,034,157 A | 3/2000 | Craun et al. |
| 6,043,333 A | 3/2000 | Kuboki et al. |
| 6,048,931 A | 4/2000 | Fujita et al. |
| 6,060,577 A | 5/2000 | Davis |
| 6,103,311 A | 8/2000 | Masuda et al. |
| 6,133,402 A | 10/2000 | Coates et al. |
| 6,225,436 B1 | 5/2001 | Eiffler et al. |
| 6,242,533 B1 | 6/2001 | Kurimoto et al. |
| 6,306,934 B1 | 10/2001 | Bode et al. |
| 6,376,021 B1 | 4/2002 | Spellane |
| 6,382,454 B1 | 5/2002 | Buffard et al. |
| 6,399,738 B1 | 6/2002 | Ito |
| 6,469,127 B1 | 10/2002 | Furunaga et al. |
| 6,472,472 B2 | 10/2002 | Jung et al. |
| 6,566,426 B1 | 5/2003 | Kanaida et al. |
| 6,576,718 B1 | 6/2003 | Yeager et al. |
| 6,579,829 B2 | 6/2003 | Nishimura et al. |
| 6,608,163 B2 | 8/2003 | Bailly et al. |
| 6,660,688 B2 | 12/2003 | Yamada et al. |
| 6,706,350 B2 | 3/2004 | Sato et al. |
| 6,723,765 B2 | 4/2004 | Bammel |
| 6,777,464 B1 | 8/2004 | Watanabe et al. |
| 6,784,228 B2 | 8/2004 | Ogura et al. |
| 6,794,445 B2 | 9/2004 | Reusmann et al. |
| 6,808,752 B2 | 10/2004 | Mallen |
| 6,833,398 B2 | 12/2004 | Agarwal et al. |
| 6,844,071 B1 | 1/2005 | Wang et al. |
| 6,894,093 B2 | 5/2005 | Bittner |
| 6,916,874 B2 | 7/2005 | Mazza et al. |
| 6,924,328 B2 | 8/2005 | Legleiter et al. |
| 6,984,262 B2 | 1/2006 | King et al. |
| 6,984,608 B2 | 1/2006 | Makitalo et al. |
| 7,022,765 B2 | 4/2006 | Adedeji et al. |
| 7,037,584 B2 | 5/2006 | Wind et al. |
| 7,063,914 B2 | 6/2006 | Kawano et al. |
| 7,078,077 B2 | 7/2006 | Lynch et al. |
| 7,087,705 B2 | 8/2006 | Ashtekar et al. |
| 7,150,902 B2 | 12/2006 | Farha |
| 7,157,119 B2 | 1/2007 | Tang et al. |
| 7,189,787 B2 | 3/2007 | O'Brien et al. |
| 7,198,849 B2 | 4/2007 | Stapperfenne et al. |
| 7,208,538 B2 | 4/2007 | Taylor et al. |
| 7,256,228 B2 | 8/2007 | Agarwal et al. |
| 7,262,261 B2 | 8/2007 | Brindopke et al. |
| 7,266,261 B2 | 9/2007 | Arias et al. |
| 7,332,557 B2 | 2/2008 | Shinohara et al. |
| 7,332,560 B2 | 2/2008 | Heuer et al. |
| 7,397,139 B2 | 7/2008 | Ikezawa et al. |
| 7,446,234 B2 | 11/2008 | More et al. |
| 7,544,727 B2 | 6/2009 | Ikezawa et al. |
| 7,585,904 B2 | 9/2009 | Nakamura |
| 7,592,047 B2 | 9/2009 | O'Brien et al. |
| 7,619,056 B2 | 11/2009 | East et al. |
| 7,635,662 B2 | 12/2009 | Kabashima et al. |
| 7,666,953 B2 | 2/2010 | Nakamura et al. |
| 7,675,185 B2 | 3/2010 | Tendou et al. |
| 7,682,674 B2 | 3/2010 | Vogt et al. |
| 7,709,582 B2 | 5/2010 | Kouchi et al. |
| 7,803,439 B2 | 9/2010 | Crawford et al. |
| 7,803,440 B2 | 9/2010 | Crawford et al. |
| 7,820,772 B2 | 10/2010 | Usui et al. |
| 7,838,577 B2 | 11/2010 | Hayakawa et al. |
| 7,846,998 B2 | 12/2010 | Akagi et al. |
| 7,910,170 B2 | 3/2011 | Evans et al. |
| 7,915,743 B2 | 3/2011 | Ishizawa et al. |
| 7,981,511 B2 | 7/2011 | Maenaka et al. |
| 7,981,515 B2 | 7/2011 | Ambrose et al. |

(56) References Cited

U.S. PATENT DOCUMENTS

| | | |
|---|---|---|
| 7,985,522 B2 | 7/2011 | Tajima et al. |
| 8,013,052 B2 | 9/2011 | Nakamura et al. |
| 8,110,614 B2 | 2/2012 | Ito et al. |
| 8,129,495 B2 | 3/2012 | Evans et al. |
| 8,142,858 B2 | 3/2012 | Mayr et al. |
| 8,168,276 B2 | 5/2012 | Cleaver et al. |
| 8,353,657 B2 | 1/2013 | Lat et al. |
| 8,449,960 B2 | 5/2013 | Skillman et al. |
| 8,465,846 B2 | 6/2013 | O'Brien et al. |
| 8,519,085 B2 | 8/2013 | Evans et al. |
| 8,795,830 B2 | 8/2014 | Wyman et al. |
| 8,906,507 B2 | 12/2014 | Campbell et al. |
| 8,927,075 B2 | 1/2015 | Gibanel et al. |
| 9,096,772 B2 | 8/2015 | Lespinasse et al. |
| 9,409,219 B2 | 8/2016 | Niederst et al. |
| 9,475,328 B2 | 10/2016 | Niederst et al. |
| 9,540,484 B2 | 1/2017 | Craun et al. |
| 9,605,177 B2 | 3/2017 | Tang et al. |
| 9,724,276 B2 | 8/2017 | Niederst et al. |
| 9,944,749 B2 | 4/2018 | Niederst et al. |
| 2003/0170396 A1 | 9/2003 | Yokoi et al. |
| 2003/0171527 A1 | 9/2003 | Burgoyne, Jr. |
| 2003/0181628 A1 | 9/2003 | Horn et al. |
| 2003/0203991 A1 | 10/2003 | Schottman et al. |
| 2003/0209553 A1 | 11/2003 | Horn et al. |
| 2003/0232145 A1 | 12/2003 | Inomata et al. |
| 2004/0044101 A1 | 3/2004 | Hirose et al. |
| 2004/0092674 A1 | 5/2004 | Brindopke et al. |
| 2004/0110908 A1 | 6/2004 | Idemura et al. |
| 2004/0171746 A1 | 9/2004 | Parekh et al. |
| 2004/0176563 A1 | 9/2004 | Shinohara et al. |
| 2004/0214916 A1 | 10/2004 | Patel et al. |
| 2004/0214926 A1 | 10/2004 | Bittner |
| 2004/0220372 A1 | 11/2004 | Qi et al. |
| 2005/0014004 A1 | 1/2005 | King et al. |
| 2005/0075465 A1 | 4/2005 | Bolle et al. |
| 2005/0090044 A1 | 4/2005 | Kayaba et al. |
| 2005/0090593 A1 | 4/2005 | Heuer et al. |
| 2005/0196629 A1 | 9/2005 | Bariatinsky et al. |
| 2005/0215670 A1 | 9/2005 | Shimasaki et al. |
| 2006/0025559 A1 | 2/2006 | Wehrmann et al. |
| 2006/0052523 A1 | 3/2006 | Bushendorf et al. |
| 2006/0134541 A1 | 6/2006 | Fujii et al. |
| 2006/0142442 A1 | 6/2006 | Scherzer et al. |
| 2007/0036903 A1 | 2/2007 | Mayr et al. |
| 2007/0065589 A1 | 3/2007 | Florian |
| 2007/0065608 A1 | 3/2007 | Niederst |
| 2007/0087146 A1 | 4/2007 | Evans et al. |
| 2007/0099130 A1 | 5/2007 | Takahashi et al. |
| 2007/0154643 A1 | 7/2007 | Schmid et al. |
| 2007/0281179 A1 | 12/2007 | Ambrose et al. |
| 2008/0033080 A1 | 2/2008 | Mader et al. |
| 2008/0171195 A1 | 7/2008 | Gothlich et al. |
| 2008/0193689 A1 | 8/2008 | Masselin et al. |
| 2008/0246173 A1 | 10/2008 | Braidwood et al. |
| 2008/0251757 A1 | 10/2008 | Yamamoto et al. |
| 2008/0314500 A1 | 12/2008 | Boers et al. |
| 2008/0319102 A1 | 12/2008 | Eckert et al. |
| 2008/0319156 A1 | 12/2008 | Fischer et al. |
| 2009/0068473 A1 | 3/2009 | Van Wessel et al. |
| 2009/0088535 A1 | 4/2009 | Arita et al. |
| 2009/0092827 A1 | 4/2009 | Robinson |
| 2009/0158963 A1 | 6/2009 | O'Dell et al. |
| 2009/0281224 A1 | 11/2009 | Koh et al. |
| 2009/0326107 A1 | 12/2009 | Bittner |
| 2010/0056663 A1 | 3/2010 | Ito et al. |
| 2010/0056721 A1 | 3/2010 | Wright et al. |
| 2010/0056726 A1 | 3/2010 | Payot et al. |
| 2010/0068433 A1 | 3/2010 | Gibanel et al. |
| 2010/0086716 A1 | 4/2010 | Ruediger et al. |
| 2010/0143681 A1 | 6/2010 | Yano et al. |
| 2010/0285309 A1 | 11/2010 | Barriau et al. |
| 2011/0042338 A1 | 2/2011 | Pecorini et al. |
| 2011/0160408 A1 | 6/2011 | De Brouwer et al. |
| 2011/0294921 A1 | 12/2011 | Smith |
| 2011/0315591 A1 | 12/2011 | Lespinasse et al. |
| 2012/0125800 A1 | 5/2012 | Doreau et al. |
| 2012/0165429 A1 | 6/2012 | Boutevin et al. |
| 2012/0172568 A1 | 7/2012 | Ueda |
| 2012/0276315 A1 | 11/2012 | Michel et al. |
| 2012/0282475 A1 | 11/2012 | Fuhry et al. |
| 2012/0301645 A1 | 11/2012 | Moussa et al. |
| 2012/0301646 A1 | 11/2012 | List et al. |
| 2012/0301647 A1 | 11/2012 | Moussa et al. |
| 2012/0302690 A1 | 11/2012 | Cunningham et al. |
| 2013/0052381 A1 | 2/2013 | Gallucci et al. |
| 2013/0206756 A1 | 8/2013 | Niederst et al. |
| 2013/0280455 A1 | 10/2013 | Evans et al. |
| 2013/0316109 A1 | 11/2013 | Niederst et al. |
| 2013/0324652 A1 | 12/2013 | Pompignano et al. |
| 2014/0113093 A1 | 4/2014 | Corbin et al. |
| 2014/0322465 A1 | 10/2014 | Kaleem et al. |
| 2015/0021323 A1 | 1/2015 | Niederst et al. |
| 2015/0151878 A1 | 6/2015 | Niederst et al. |
| 2015/0203713 A1 | 7/2015 | Niederst et al. |
| 2016/0107818 A1 | 4/2016 | Kaleem et al. |
| 2016/0122581 A1 | 5/2016 | You et al. |
| 2016/0272576 A1 | 9/2016 | Gibanel et al. |
| 2017/0029657 A1 | 2/2017 | Niederst et al. |
| 2017/0051177 A1 | 2/2017 | Prouvost et al. |
| 2017/0088745 A1 | 3/2017 | Matthieu et al. |
| 2017/0096521 A1 | 4/2017 | Niederst et al. |

FOREIGN PATENT DOCUMENTS

| | | |
|---|---|---|
| CA | 2280409 C | 5/2008 |
| EP | 0265791 A2 | 5/1988 |
| EP | 0313862 A2 | 5/1989 |
| EP | 0475359 A2 | 3/1992 |
| EP | 0620238 A2 | 10/1994 |
| EP | 0185118 B1 | 9/1995 |
| GB | 1037895 A | 8/1966 |
| GB | 2113118 | * 12/1982 |
| JP | S63304068 A | 12/1988 |
| JP | H0255727 A | 2/1990 |
| JP | H07126574 A | 5/1995 |
| JP | H07138502 A | 5/1995 |
| JP | H07196770 A | 8/1995 |
| JP | H08151428 A | 6/1996 |
| JP | H08230328 A | 9/1996 |
| JP | 2000005019 A | 1/2000 |
| JP | 2002097250 A | 4/2002 |
| JP | 2002138245 A | 5/2002 |
| JP | 2002155727 A | 5/2002 |
| JP | 2002220563 A | 8/2002 |
| JP | 2003012763 A | 1/2003 |
| JP | 2003176348 A | 6/2003 |
| JP | 2003178348 A | 6/2003 |
| JP | 2003183352 A | 7/2003 |
| JP | 3484546 B2 | 1/2004 |
| JP | 2004010874 A | 1/2004 |
| JP | 2004053016 A | 2/2004 |
| JP | 2005320446 A | 11/2005 |
| JP | 2006176658 A | 7/2006 |
| KR | 100804293 B1 | 2/2008 |
| WO | WO-9526997 A1 | 10/1995 |
| WO | WO-9728905 A1 | 8/1997 |
| WO | WO-9850477 A1 | 11/1998 |
| WO | WO-0071337 A1 | 11/2000 |
| WO | WO-2004050740 A1 | 6/2004 |
| WO | WO-2007048094 A2 | 4/2007 |
| WO | WO-2007054304 A1 | 5/2007 |
| WO | WO-2008137562 A1 | 11/2008 |
| WO | WO-2009015493 A1 | 2/2009 |
| WO | WO-2009036790 A1 | 3/2009 |
| WO | WO-2010068673 A1 | 6/2010 |
| WO | WO-2010118349 A1 | 10/2010 |
| WO | WO-2010118356 A1 | 10/2010 |
| WO | WO-2011130671 A2 | 10/2011 |
| WO | WO-2012091701 A1 | 7/2012 |
| WO | WO-2012109278 A2 | 8/2012 |
| WO | WO-2012149340 A1 | 11/2012 |
| WO | WO-2012151184 A1 | 11/2012 |
| WO | WO-2012161758 A2 | 11/2012 |

(56) References Cited

FOREIGN PATENT DOCUMENTS

| WO | WO-2012162298 A1 | 11/2012 |
|---|---|---|
| WO | WO-2012162299 A1 | 11/2012 |
| WO | WO-2013119686 A1 | 8/2013 |
| WO | WO-2013149234 A2 | 10/2013 |
| WO | WO-2013169459 A1 | 11/2013 |
| WO | WO-2014025997 A1 | 2/2014 |
| WO | WO-2014140233 A1 | 9/2014 |
| WO | WO-2014140234 A1 | 9/2014 |
| WO | WO-2016201407 A1 | 12/2016 |

OTHER PUBLICATIONS

Application and File History for U.S. Appl. No. 13/570,632, filed Aug. 9, 2012, Inventors: Niederst, et al, 1250 pages.

Application and File History for U.S. Appl. No. 14/453,203, filed Aug. 6, 2014, Inventors: Niederst, et al, 572 pages.

Application and File History for U.S. Appl. No. 15/204,559, filed Jul. 7, 2016, Inventors: Niederst, et al, 195 pages.

Application and File History for U.S. Appl. No. 15/290,765, filed Oct. 11, 2016, Inventors: Niederst, et al, 215 pages.

Application and File History for U.S. Appl. No. 15/803,127, filed Nov. 3, 2017, Inventors: Evans, et al.

Application and File History for U.S. Appl. No. 15/803,657, filed Nov. 3, 2017, Inventors: Evans, et al.

CertiChem Inc., "Test Method Nomination: MCF-7 Cell Proliferation Assay of Estrogenic Activity," National Toxicology Program Interagency Center for the Evaluation of Alternative Toxicological Methods (NICEATM), Jun. 2007, 102 pages, Retrieved from https://ntp.niehs.nih.gov/iccvam/methods/endocrine/endodocs/submdoc.pdf.

Declaration of Dr. Larry B. Brandenburger under 37 C.P.R. §1.132 for Control U.S. Appl. No. 95/001,950 Concerning Inter Partes Reexamination of U.S. Pat. No. 8,092,876, 12 pages.

Dow Chemical Company., "D.E.R.™ 661, Solid Epoxy Resin," Product Information, Form No. 296-01462-1007X-TD, 3 pages.

Dytek® A-Amine, Downloaded from the Oct. 16, 2014, Internet Archives capture at [https://web.archive.org/web/20141016043145/http://dytek.invista.com/Products/Amines/dytek-a-amine].

Eastman, "Eastman TritanTM Copolyester—Lack of Estrogen and Testosterone Activity," TRS-270, Apr. 2010, 3 pages.

European Search Report for Application No. 12744671.4, dated Dec. 17, 2015, 5 pages.

European Search Report for Application No. 12790169.2, dated Nov. 26, 2015, 5 pages.

European Search Report for Application No. 17182623.3, dated Oct. 11, 2017, 8 pages.

Ex parte Rinkevich (Appeal No. 2007-1317, 2007 WL 1552288) (BPAI 2007).

Extended European Search Report for Application No. 13827098.8, dated Apr. 8, 2016, 7 pages.

Extended European Search Report for Application No. 15779232.6, dated Feb. 23, 2018, 13 pages.

Extended European Search Report for Application No. EP13827304, dated Mar. 21, 2016, 11 pages.

Fang H., et al., "Quantitative Comparisons of in Vitro Assays for Estrogenic Activities," Environmental Health Perspectives, Aug. 2000, vol. 108 (8), pp. 723-729.

Fang H., et al., "Structure-Activity Relationships for a Large Diverse Set of Natural, Synthetic, and Environmental Estrogens," Chemical Research in Toxicology, Mar. 2001, vol. 14 (3), pp. 280-294.

"Flame Retardant Bisphenol F", Product Information Sheets, Nippon Kasei Chemical, 2013, 2 pages.

Flick E.W., "Epoxy Resins, Curing Agents, Compounds, and Modifiers—An Industrial Guide," Second Edition, 1993, 10 pages, available at http://www.daryatamin.com/uploads/Books%20File/Epoxy%20Resins,%20Curing%20Agents,%20Compounds,%20and . . .

Grace Darex® Packaging Technologies, A Global Partner for Your Global Business, Product Book, 2006, 4 pages.

Guilin, et al., "Environmentally Friendly Paint Formulation Design," Chemical Industry Press, ISBN: 978-7-5025-9943-0, 2007, pp. 207-209 (6 pages).

Hashimoto Y., et al., "Measurement of Estrogenic Activity of Chemicals for the Development of New Dental Polymers," Toxicology in Vitro, 2001, vol. 15 (4-5), pp. 421-425.

International Preliminary Reporton Patentability for Application No. PCT/US2011/032738, dated Oct. 26, 2012, 5 pages.

International Preliminary Reporton Patentability for Application No. PCT/US2012/024191, dated Aug. 22, 2013, 7 pages.

International Preliminary Report on Patentability for Application No. PCT/US2012/024193, dated Aug. 22, 2013, 7 pages.

International Preliminary Report on Patentability for Application No. PCT/US2013/024960, dated Aug. 21, 2014, 9 pages.

International Preliminary Report on Patentability for Application No. PCT/US2013/032648, dated Feb. 19, 2015, 9 pages.

International Preliminary Report on Patentability for Application No. PCT/US2013/054132, dated Feb. 19, 2015, 8 pages.

International Preliminary Report on Patentability for Application No. PCT/US2015/025723, dated Oct. 27, 2016, 11 pages.

International Search Report and Written Opinion for Application No. PCT/US2011/032738 dated Jan. 18, 2012, 13 pages.

International Search Report and Written Opinion for Application No. PCT/US2012/024191, dated Dec. 28, 2012, 13 pages.

International Search Report and Written Opinion for Application No. PCT/US2012/024193 dated Oct. 31, 2012, 9 pages.

International Search Report and Written Opinion for Application No. PCT/US2013/024960, dated May 31, 2013, 11 pages.

International Search Report and Written Opinion for Application No. PCT/US2013/032648, dated Jul. 24, 2013, 10 pages.

International Search Report and Written Opinion for Application No. PCT/US2013/054132, dated Oct. 23, 2013, 10 pages.

International Search Report and Written Opinion for Application No. PCT/US2015/025723, dated Jun. 29, 2015, 16 pages.

Kitamura S., et al., "Comparative Study of the Endocrine-Disrupting Activity of Bisphenol A and 19 Related Compounds," Toxicological Sciences, Jan. 5, 2005, vol. 84 (2), pp. 249-259.

Kobayashi S., et al., "Stereo Structure-Controlled and Electronic Structure-Controlled Estrogen-Like Chemicals to Design and Develop Non-estrogenic Bisphenol A Analogs Based on Chemical Hardness Concept," Chemical & Pharmaceutical Bulletin,Dec. 2006, vol. 54 (12), pp. 1633-1638.

Liu Z., et al., "Preparation, Characterization and Thermal Properties of Tetramethylbisphenol F Exposy Resin and Mixed Systems," Polymer International, Apr. 2012, vol. 61 (4), pp. 565-570.

Matasa C.G., et al., "A Wish List for Orthodontic Materials, 2005," The Orthodontic Materials Insider, Dec. 2004, vol. 16 (4), 8 pages.

Matsumoto S., et al., "The Crystal Structure of Two New Developers for High-Performance Thermo-Sensitive Paper: H-Bonded Network in Urea-Urethane Derivatives," Dyes and Pigments, May 2010, vol. 85 (3), pp. 139-142.

Mendum T., et al., "Concentration of Bisphenol A in Thermal Paper," Green Chemistry Letters and Reviews, Research Letter, Mar. 2011, vol. 4 (1), pp. 81-86.

Mesnage, et al., "Transcriptome Profiling Reveals Bisphenol A Alternatives Activate Estrogen Receptor Alpha in Human Breast Cancer Cells," Toxicological Sciences, 2017, vol. 158 (2), pp. 431-443.

Meti, "Current Status of Testing Methods Development For Endocrine Disrupters," 6th Meeting of the Task Force on Endocrine Disrupters Testing and Assessment (EDTA), Tokyo, Ministry of Economy, Trade and Industry, Japan, Jun. 24-25, 2002, 70 pages.

Momentive Specialty Chemicals Inc.., "Epon™ and Epi-Rez™ Epoxy Resins," Product Selector, Aug. 2013, 16 pages.

Moss G.P., "Extension and Revision of the Von Baeyer System for Naming Polycyclic Compounds (Including Bicyclic Compounds)," Pure and Applied Chemistry, 1999, vol. 71 (3), pp. 513-529.

Olin North America Epoxy Resins (2016) brochure available at: https://www.brenntag.com/media/documents/bsi/product_data_sheets/material_science/olin_ep oxy_resins/ . . . , 12 pages.

(56) References Cited

OTHER PUBLICATIONS

Olsen C.M., et al., "Effects of the Environmental Oestrogens Bisphenol A, Tetrachlorobisphenol A, Tetrabromobisphenol A, 4-Hydroxybiphenyl and 4,4'-Dihydroxybiphenyl on Oestrogen Receptor Binding, Cell Proliferation and Regulation of Oestrogen Sensitive Proteins in the Human Breast Cancer Cell Line MCF-7," Pharmacology and Toxicology, Apr. 2003, vol. 92 (4), pp. 180-188.
Parent Application, U.S. Appl. No. 13/651,796, Evans et al., filed Oct. 15, 2012.
Partial Supplementary European Search Report for Application No. 15779232.6, dated Oct. 17, 2017, 14 pages.
Polycarbonates, 4th-5th Edition, Kirk-Othmer Encyclopedia of Chemical Technology, 2000, pp. 1-30.
Poly(p-phenylene oxide), Wikipedia: The Free Encyclopedia, accessed Apr. 6, 2015, http://en.wikipedia.org/wiki/Poly(p-phenylene_oxide, 3 pages.
Porter D.S., et al., "Hot-Fill Containers," New Tech for OPP & PET, Plastics Technology, Eastman Chemical Co., Dec. 2007, 6 pages.
Ravdin, et al., "Estrogenic Effects of Phenolphthalein on Human Breast Cancer Cells In Vitro," Breast Cancer Research and Treatment, Jun. 1987, vol. 9 (2), pp. 151-154.
Rosenmai, et al., "Are Structural Analogues to Bisphenol a Safe Alternatives?," Toxicological Sciences, vol. 139 (1), 2014, pp. 35-47.
Song K.H., et al., "Endocrine Disrupter Bisphenol A Induces Orphan Nuclear Receptor Nur77 Gene Expression and Steroidogenesis in Mouse Testicular Leydig Cells," Endocrinology, Jun. 2002, vol. 143 (6), pp. 2208-2215.
Soto A.M., "Evidence of Absence: Estrogenicity Assessment of a New Food-Contact Coating and the Bisphenol Used in Its Synthesis," Environmental Science and Technology, 2017, vol. 51 (3), pp. 1718-1726.
Supplementary European Search Report for Application No. 11769696.3, dated Jun. 27, 2014, 7 pages.
Supplementary European Search Report for Application No. 13746877.3, dated Nov. 30, 2015, 8 pages.
The Electrochemical Society, "Corrosion and Corrosion Prevention," retrieved from https://www.electrochem.org/corrosion-science, on Sep. 3, 2019, 2 pages.
Tice R.R., "The Single Cell Gel/Comet Assay: A Microgel Electrophoretic Technique for the Detection of DNA Damage and Repair in Individual Cells," Environmental Mutagenesis, 1995, pp. 315-339.
U.S. Food and Drug Administration, "Bisphenol A (BPA): Use in Food Contact Application," 9 pages, [retrieved on Dec. 28, 2017], Retrieved from the Internet [URL: www.fda.gov/newsevents/publichealthfocus/ucm064437.htm].
Vinas P., et al., "Comparison of Two Derivatization-Based Methods for Solid-Phase Microextraction-Gas Chromatography-Mass Spectrometric Determination of Bisphenol A, Bisphenol S and Biphenol Migrated from Food Cans," Analytical and Bioanalytical Chemistry, Feb. 2010, vol. 397 (1), pp. 115-125.
Vogel S., "A Non-Estrogenic Alternative to Bisphenol A at Last?," Environmental Defense Fund, (A blog post dated Jan. 23, 2017), 6 pages.
Woo B.G., et al., "Melt Polycondensation of Bisphenol A Polycarbonate by a Forced Gas Sweeping Process," Industrial & Engineering Chemistry Research, Feb. 2001, vol. 40 (5), pp. 1312-1319.

\* cited by examiner

CONTAINER COATING SYSTEM

CROSS REFERENCE TO RELATED APPLICATION

This application a continuation of U.S. application Ser. No. 14/418,040 filed on Jan. 28, 2015, which is a National Stage Entry of International Application No. PCT/US2013/032648 filed on Mar. 15, 2013, which claims priority to U.S. Provisional Application Ser. No. 61/681,590, filed Aug. 9, 2012, all entitled "CONTAINER COATING SYSTEM", the disclosures of all which are incorporated herein by reference.

TECHNICAL FIELD

This invention relates to container coating compositions.

BACKGROUND

Protective coatings are applied to food and beverage containers (e.g., cans) to prevent the contents from coming into contact with the container's metal surface. Contact of the container contents with the metal surface (e.g., the interior), especially where acidic products such as soft drinks, tomato juice or beer are involved, can lead to metal container corrosion and result in container content contamination and deterioration. Protective coatings are also applied to the interior of food and beverage containers to prevent corrosion in the container headspace between the food product fill line and the container lid, which is particularly problematic with high salt content food products. Multi-coat coating systems that have been used to coat the interior of food and beverage containers typically contain an epoxy resin incorporating bisphenol A (BPA) cross-linked with a phenolic resin

SUMMARY

There is a desire to reduce or eliminate certain BPA-based compounds from food-contact coatings. The present invention provides, in one aspect, a container, or a portion thereof, comprising a coating composition comprising a polymer having (i) one or more aryl or heteroaryl groups in which each aryl or heteroaryl group includes an oxygen atom attached to the ring and a substituent group (e.g., a "bulky" substituent group) attached to the ring at an ortho or meta position relative to the oxygen atom, (ii) two or more aryl or heteroaryl groups joined by a polar linking group or by a linking group having a molecular weight of at least 125 Daltons; or having the features of both (i) and (ii); and wherein the composition is free of polyhydric phenols having estrogenic activity greater than or equal to bisphenol S.

The present invention provides in another aspect a container, or a portion thereof comprising a metal substrate; and a multi-coat coating system applied on at least a portion of the metal substrate comprising an undercoat composition and an overcoat composition, wherein the undercoat, overcoat or both the undercoat and overcoat comprise a polymer having one or more segments of the below Formula I:

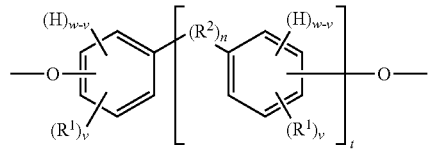

[Formula I]

wherein:
H denotes a hydrogen atom, if present;
each $R^1$ is preferably independently an atom or group preferably having at atomic weight of at least 15 Daltons wherein each of the phenylene groups depicted in Formula I includes at least one $R^1$ group attached to the phenylene ring preferably at an ortho or meta position relative to the oxygen atom;
v is independently 0 to 4; with the proviso that if v is 0, then n is 1 or the phenylene groups depicted in Formula I join to form a fused ring system
w is 4;
$R^2$, if present, is preferably a divalent group;
n is 0 or 1, with the proviso that if n is 0, the phenylene rings depicted in Formula I can optionally join to form a fused ring system (e.g., a substituted naphthalene group) in which case w is 3 (as opposed to 4) and v is 0 to 3 (as opposed to 0 to 4);
t is 0 or 1;
if v is 0 and t is 1, $R^2$ is a polar linking group or a linking group having a molecular weight of at least 125 Daltons;
two or more $R^1$ or $R^2$ groups can optionally join to form one or more cyclic groups; and
wherein the coating system is preferably substantially free of bisphenol A, bisphenol F, bisphenol S, polyhydric phenols having estrogenic activity greater than or equal to that of bisphenol S, and epoxides thereof.

When t is 1, the segment of Formula I is a segment of the below Formula IA.

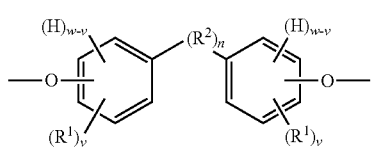

Formula IA

When t is 0, the segment of Formula I is a segment of the below Formula IB:

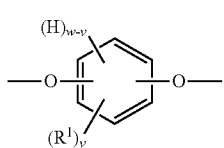

Formula IB

The present invention provides, in another aspect, a method comprising:
applying an undercoat composition to at least a portion of a metal substrate prior to or after forming the metal substrate into a container,
drying or at least partially curing the undercoat composition, applying and curing an overcoat composition to produce a cured multi-coat coating adhered to the metal substrate, wherein the undercoat, overcoat or both the undercoat and overcoat comprise a polymer having one or more segments of the above Formula I and the cured multi-coat coating is substantially free of polyhydric phenols having estrogenic activity greater than or equal to that of bisphenol S.

In yet another aspect, the invention provides a coating system in which the undercoat composition comprises a polymer having one or more segments of the above Formula I and the overcoat composition comprises a thermoplastic dispersion, more preferably an organosol.

The details of one or more embodiments of the invention are set forth in the description below. Other features, objects, and advantages of the invention will be apparent from the description and the claims.

Definitions

Unless otherwise specified, the following terms as used herein have the meanings provided below.

As used herein, "a," "an," "the," "at least one," and "one or more" are used interchangeably. Thus, for example, a coating composition that comprises "a" polyhydric phenol means that the coating composition includes "one or more" polyhydric phenols.

The term "aryl group" (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as "arylene" or "heteroarylene" groups (e.g., furylene, pyridylene, etc.)

The term "bisphenol" refers to a polyhydric polyphenol having two phenylene groups that each includes six-carbon rings and a hydroxyl group attached to a carbon atom of the ring, wherein the rings of the two phenylene groups do not share any atoms in common.

The term "closure compound" refers to a material applied to a topcoat of an interior surface of a closure (e.g., twist off lids or caps) for purposes of sealing the closure to a container. The term includes, for example, PVC-containing closure compounds (including, e.g., plastisols) for sealing closures to food or beverage containers.

The terms "comprises" and variations thereof do not have a limiting meaning where these terms appear in the description and claims.

The term "crosslinker" refers to a molecule capable of forming a covalent linkage between polymers or between two different regions of the same polymer.

The terms "estrogenic activity" or "estrogenic agonist activity" refer to the ability of a compound to mimic hormone-like activity through interaction with an endogenous estrogen receptor, typically an endogenous human estrogen receptor.

The term "food-contact surface" refers to a surface of an article (e.g., a food or beverage container) that is in contact with, or suitable for contact with, a food or beverage product.

A group that may be the same or different is referred to as being "independently" something. Substitution on the organic groups of the compounds of the present invention is contemplated. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether, haloalkyl, nitroalkyl, carboxyalkyl, hydroxyalkyl, sulfoalkyl and like groups. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

Unless otherwise indicated, a reference to a "(meth) acrylate" compound (where "meth" is in parenthesis) is meant to include acrylate, methacrylate or both compounds.

The term "mobile" when used with respect to a compound means that the compound can be extracted from a cured composition when the cured composition (typically ~1 mg/cm$^2$) is exposed to a test medium for some defined set of conditions, depending on the end use. An example of these testing conditions is exposure of the cured coating to HPLC-grade acetonitrile for 24 hours at 25° C.

The term "multi-coat coating system" refers to a coating system that includes at least two layers. In contrast, a "mono-coat coating system" as used herein refers to a coating system that includes only a single layer.

The term "on," when used in the context of a coating applied on a surface or substrate, includes both coatings applied directly or indirectly to the surface or substrate. Thus, for example, a coating applied to a undercoat layer overlying a substrate constitutes a coating applied on the substrate.

The term "organosol" refers to a dispersion of thermoplastic particles in a liquid carrier that includes an organic solvent or a combination of an organic solvent and a plasticizer.

The term "overcoat composition" means a coating composition to be applied to an undercoat composition or to one or more intermediate layers applied to an undercoat composition. The term includes topcoats.

The term "phenylene" as used herein refers to a six-carbon atom aryl ring (e.g., as in a benzene group) that can have any substituent groups (including, e.g., halogen atoms, oxygen atoms, hydrocarbon groups, hydroxyl groups, and the like). Thus, for example, the following aryl groups are each phenylene rings: —C$_6$H$_4$—, —C$_6$H$_3$(CH$_3$)—, and —C$_6$H(CH$_3$)$_2$Cl—. In addition, for example, each of the aryl rings of a naphthalene group is a phenylene ring.

The term "plastisol" refers to a dispersion of thermoplastic particles in a plasticizer.

The term "polyhydric monophenol" refers to a polyhydric phenol that (i) includes an aryl or heteroaryl group (more typically a phenylene group) having at least two hydroxyl groups attached to the aryl or heteroaryl ring and (ii) does not include any other aryl or heteroaryl rings having a hydroxyl group attached to the ring. The term "dihydric monophenol" refers to a polyhydric monophenol that only includes two hydroxyl groups attached to the aryl or heteroaryl ring.

The term "polyhydric phenol" as used herein refers broadly to any compound having one or more aryl or heteroaryl groups (more typically one or more phenylene groups) and at least two hydroxyl groups attached to a same or different aryl or heteroaryl ring. Thus, for example, both hydroquinone and 4,4'-biphenol are considered to be polyhydric phenols. As used herein, polyhydric phenols typically have six carbon atoms in an aryl ring, although it is contemplated that aryl or heteroaryl groups having rings of other sizes may be used.

The term "polyhydric polyphenol" (which includes bisphenols) refers to a polyhydric phenol that includes two or more aryl or heteroaryl groups each having at least one hydroxyl group attached to the aryl or heteroaryl ring.

The term "polymer" includes both homopolymers and copolymers (e.g., polymers of two or more different monomers).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The term "substantially free" when used with respect to a composition that may contain a particular mobile compound means that the recited composition or a cured coating thereof contains less than 1,000 parts per million (ppm) of the recited mobile compound. The term "essentially free" of a particular mobile compound means that the recited composition or a cured coating thereof contains less than 100 parts per million (ppm) of the recited mobile compound. The term "essentially completely free" of a particular mobile compound means that the recited composition or a cured coating thereof contains less than 5 parts per million (ppm) of the recited mobile compound. The term "completely free" of a particular mobile compound means that the recited composition or a cured coating thereof contains less than 20 parts per billion (ppb) of the recited mobile compound. If the aforementioned phrases are used without the term "mobile" (e.g., "substantially free of BPA") then the recited polymer or composition contains less than the aforementioned amount of the compound whether the compound is mobile in the coating or bound to a constituent of the coating.

The term "undercoat composition" means a coating composition to be applied between a surface of a substrate and an overcoat composition. The term includes basecoats, primer coats and size coats.

The term "upgrade polyhydric phenol" means a polyhydric phenol capable of participating in a reaction with a polyepoxide to build molecular weight and preferably form a polymer.

A "vinyl organosol," as used herein, is a dispersion of vinyl chloride polymer (preferably high-molecular-weight vinyl chloride polymer) in a liquid carrier that includes an organic solvent or a combination of an organic solvent and a plasticizer.

Also herein, the recitations of numerical ranges by endpoints include all numbers subsumed within that range (e.g., 1 to 5 includes 1, 1.5, 2, 2.75, 3, 3.80, 4, 5 and the like and at least 1 include 1, 1.5, 2, 17, and the like.).

DETAILED DESCRIPTION

The disclosed polymer is useful in a variety of container coating applications. In preferred embodiments, the polymer does not include any structural units derived or derivable from polyhydric phenols such as bisphenol A (BPA), bisphenol F (BPF), bisphenol S (BPS), and preferably do not include any structural units derived from or derivable from a reaction of such polyhydric phenols with a diepoxide (e.g., structural units derived from the diglycidyl ether of BPA (BADGE)). Preferably, the polymer does not include any structural units derived from or derivable from a polyhydric phenol having estrogenic agonist activity greater than or equal to that of 4,4'-(propane-2,2-diyl)polyhydric phenol. More preferably, the polymer does not include any structural units derived from or derivable from a polyhydric phenol having estrogenic agonist activity greater than or equal to that of BPS. Even more preferably, the polymer does not include (e.g., is substantially free or completely free of) any structural units derived from or derivable from a polyhydric phenol having estrogenic agonist activity greater than 4,4'-(propane-2,2-diyl)bis(2,6-dibromophenol). Optimally, the polymer does not include any structural units derived from or derivable from a polyhydric phenol having estrogenic agonist activity greater than 2,2-bis(4-hydroxyphenyl)propanoic acid).

In preferred embodiments, the polymer is a polyether polymer that contains a plurality of aromatic ether segments. The polymer may be formed using a polyol (e.g. a diol) and a polyepoxide (e.g. a diepoxide) which include one or more segments of Formula I. The polyether polymer may be formed, for example, from reactants including a polyhydric phenol and a polyepoxide (e.g., a polyepoxide of a polyhydric phenol such as, a diepoxide of a dihydric phenol).

While not intending to be bound by theory, it is believed that a polyhydric phenol is less likely to exhibit any appreciable estrogenic agonist activity if the compound's chemical structure is sufficiently different from compounds having estrogenic activity such as diethylstilbestrol. The structures of preferred polyhydric phenol compounds, as will be discussed herein, are sufficiently different such that the compounds do not bind and activate a human estrogen receptor. These preferred compounds are, in some instances, at least about 6 or more orders of magnitude less active than diethylstilbestrol (e.g., when assessing estrogenic agonist effect using an in vitro assay such as the MCF-7 cell proliferation assay discussed below). Without being bound by theory, it is believed that such desirable structural dissimilarity can be introduced via one or more structural features, including any suitable combination thereof. For example, it is believed that one or more of the following structural characteristics can be used to achieve such structural dissimilarity:

steric hinderance (e.g., relative to one or more hydroxyl phenols), molecular weight that is arranged in three-dimensional space such that: (i) the compound does not fit, or does not readily fit, in the active site of a human estrogen receptor or (ii) the structural configuration interferes with activation of the human estrogen receptor once inside the active site, and the presence of polar groups.

The disclosed polymer may be used in an undercoat composition, overcoat composition or both. In preferred embodiments the disclosed polymer may be used in an undercoat composition. The disclosed polymer includes at least one or more segments of the Formula I, where v, w, $R^1$, $R^2$, n and t are as previously described:

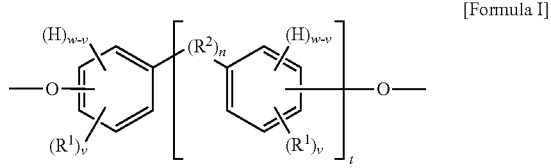

[Formula I]

When t is 1, the segment of Formula I is a segment of the below Formula IA:

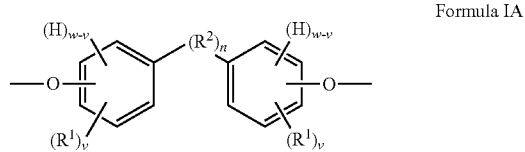

Formula IA

When t is 0, the segment of Formula I is a segment of the below Formula IB:

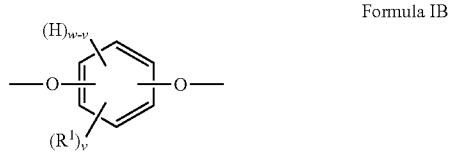

Formula IB

As depicted in Formula I, the segment includes at least one phenylene group when t is 0 (illustrated in Formula IB) and includes at least two phenylene groups when t is 1 (illustrated in Formula IA). The segments of each of Formulas IA and IB may optionally include one or more additional phenylene or other aryl or heteroaryl groups in addition to those depicted. Although aryl groups having a six-carbon aromatic ring are presently preferred, it is contemplated that any other suitable aryl or heteroaryl groups may be used in place of the phenylene groups depicted in Formula I, with appropriate adjustment in the allowable values for w and v. As depicted in the above Formula I, the substituent groups (e.g., —O—, H, $R^1$, and $R^2$) of each phenylene group can be located at any position on the phenylene ring relative to one another, although in preferred embodiments at least one $R^1$ is positioned on the ring immediately adjacent to the oxygen atom. In other embodiments in which other aryl or heteroarylene groups are used in place of the depicted phenylene groups in Formula I, it is contemplated that the same would hold true for the substituent groups of such other aryl or heteroarylene groups.

In preferred embodiments, $R^1$ is attached to the phenylene ring at a carbon atom immediately adjacent to the carbon atom to which the depicted oxygen atom is attached. In other words, $R^1$ is preferably located at an ortho position on the ring relative to the oxygen atom. In some embodiments, an $R^1$ is located immediately adjacent to the oxygen on either side. That is, in some embodiments, an $R^1$ is located at each ortho position on the ring relative to the oxygen atom. While not intending to be bound by theory, it is believed that the positioning of one or more $R^1$ groups at an ortho position relative to the oxygen atom depicted in Formula I may be beneficial, for example, in the event that monomer used to make the segment of Formula I is not fully reacted into the polymer. Such unreacted monomer could potentially migrate out of a cured coating composition containing the polymer. The benefits of $R^1$ with regards to an absence of appreciable estrogenic activity in certain such potentially mobile compounds are discussed in greater detail below.

While not intending to be bound by theory, it is believed that a polyhydric phenol compound is less likely to exhibit appreciable estrogenic activity if the one or more hydroxyl groups present on each aryl ring (typically phenol hydroxyl groups) are sterically hindered by one or more other substituents of the aryl ring, as compared to a similar polyhydric phenol compound having hydrogen atoms present at each ortho position. It is believed that it may be preferable to have substituent groups positioned at each ortho position relative to the aforementioned hydroxyl groups to provide optimal steric effect to reduce accessibility or reactivity of the hydroxyl group, or both. While it is preferred to position the substituent groups at one or both ortho positions, a sufficiently "bulky" substituent group(s) located at one or both meta positions may also provide the desired effect.

Preferred $R^1$ groups are sufficiently "bulky" to provide a suitable level of steric hindrance for the aforementioned hydroxyl groups to achieve the desired effect. To avoid any ambiguity, the term "group" when used in the context of $R^1$ groups refers to both single atoms (e.g., a halogen atom) and molecules (e.g., two or more atoms). The optimal chemical constituents, size, or configuration (e.g., linear, branched, and the like) of the one or more $R^1$ groups may depend on a variety of factors, including, for example, the location of the $R^1$ group on the aryl ring.

Preferred segments of Formula I include one or more $R^1$ groups having an atomic weight of at least 15 Daltons. In some embodiments, the segments of Formula I include one or more $R^1$ groups having an atomic weight of at least 25, at least 40, or at least 50 Daltons. While the maximum suitable size of $R^1$ is not particularly limited, typically it will be less than 500 Daltons, more typically less than 100 Daltons, and even more typically less than 60 Daltons. Non-limiting examples of $R^1$ groups include groups having at least one carbon atom (e.g., organic groups), halogen atoms, sulfur-containing groups, or any other suitable group that is preferably substantially non-reactive with an epoxy group.

In presently preferred embodiments, one or more $R^1$ groups of each phenylene group include at least one carbon atom, more preferably 1 to 10 carbon atoms, and even more preferably 1 to 4 carbon atoms. $R^1$ will typically be a saturated or unsaturated hydrocarbon group, more typically saturated, that may optionally include one or more heteroatoms other than carbon or hydrogen atoms (e.g., N, O, S, Si, a halogen atom, and the like). Examples of suitable hydrocarbon groups may include substituted or unsubstituted groups including alkyl groups (e.g., methyl, ethyl, propyl, butyl groups, and the like, including isomers thereof), alkenyl groups, alkynyl groups, alicyclic groups, aryl groups, or combinations thereof.

In certain preferred embodiments, each phenylene group depicted in Formula I includes at least one alkyl $R^1$ group. As discussed above, any suitable isomer may be used. Thus, for example, a linear butyl group or a branched isomer such as an isobutyl group or a tert-butyl group may be used. In one embodiment, a tert-butyl group (and more preferably a tert-butyl moiety) is a preferred $R^1$ group.

As previously mentioned, it is contemplated that $R^1$ may include one or more cyclic groups. In addition, $R^1$ may form a cyclic or polycyclic group with one or more other $R^1$ groups or $R^2$ or both.

In some embodiments, one or both phenylene groups depicted in Formula I include an $R^1$ group that is a halogen atom located ortho to the oxygen, more preferably a higher molecular weight halogen such as bromine or iodine. However, in preferred embodiments, the segment of Formula I does not include any halogen atoms. Moreover, in presently preferred embodiments, the polymer including one or more segments of Formula I is preferably free of halogen atoms.

In some embodiments, a suitable $R^1$ group is selected and positioned at the ortho position such that a width "f" measured perpendicular from a centerline of the phenylene group (or other suitable aryl group) to the maximal outside extent of the van der Waals volume of $R^1$ (corresponding to the radius of the van der Waals radius of $R^1$) is greater than about 4.5 Angstroms. This width measurement may be determined via theoretical calculation using suitable molecular modeling software and is illustrated below.

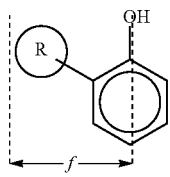

As illustrated above, the centerline for the depicted phenylene group includes the carbon atom to which the phenol hydroxyl group attaches and the para carbon atom. For example, while not intending to be bound by theory, it is believed that it is generally desirable that f be greater than about 4.5 Angstroms if $R^2$ is a —C(CH$_3$)$_2$— group. In some embodiments, $R^1$ may be selected and positioned at an ortho position such that f is less than about 4.5 Angstroms. For example, if $R^2$ is a methylene bridge (—CH$_2$—), then in some embodiments, $R^1$ can be selected and positioned such that f is less than about 4.5 Angstroms. For example, this is believed to be the case for certain preferred segments of Formula I derived from, e.g., 4,4'-methylenebis(2,6-dimethylphenol).

$R^2$ is present or absent in the segment of Formula IA depending on whether n is 0 or 1. When $R^2$ is absent either (i) a carbon atom of one phenylene ring is covalently attached to a carbon atom of the other phenylene ring (which occurs when w is 4) or (ii) the phenylene groups depicted in Formula IA join to form a fused ring system (which occurs when w is 3 and the two phenylene groups are so fused). In some embodiments, $R^2$ (or the ring-ring covalent linkage if $R^2$ is absent) is preferably attached to at least one, and more preferably both, phenylene rings at a para position (e.g., a 1,4-position) relative to the oxygen atom depicted in Formula IA. An embodiment of the segment of Formula IA, in which n is 0, w is 3 and v is independently 0 to 3 such that the two phenylene groups have joined to form a naphthalene group, is depicted below:

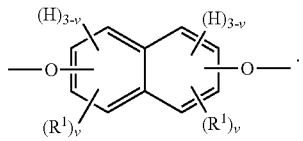

$R^2$ can be any suitable divalent group including, for example, carbon-containing groups (which may optionally include heteroatoms such as, e.g., N, O, P, S, Si, a halogen atom, and the like), sulfur-containing groups (including, e.g., a sulfur atom, a sulfinyl group —(O)—, a sulfonyl group —S(O$_2$)—, and the like), oxygen-containing groups (including, e.g., an oxygen atom, a ketone group, and the like), nitrogen-containing groups, or a combination thereof.

In preferred embodiments of the segment of Formula IA, $R^2$ is present and is typically an organic group containing less than about 15 carbon atoms, and even more typically 1 or 4-15 carbon atoms. In some embodiments, $R^2$ includes 8 or more carbon atoms. $R^2$ will typically be a saturated or unsaturated hydrocarbon group, more typically a saturated divalent alkyl group, and most preferably an alkyl group that does not constrain the movement of the connected phenylene groups in an orientation similar to that of diethylstilbestrol or dienestrol. In some embodiments, $R^2$ may include one or more cyclic groups, which may be aromatic or alicyclic and can optionally include heteroatoms. The one or more optional cyclic groups of $R^2$ can be present, for example, (i) in a chain connecting the two phenylene groups depicted in Formula IA, (ii) in a pendant group attached to a chain connecting the two phenylene groups, or both (i) and (ii).

The atomic weight of the $R^2$ group, if present, may be any suitable atomic weight. Typically, however, $R^2$ has an atomic weight of less than about 500 Daltons, less than about 400 Daltons, less than about 300 Daltons, or less than about 250 Daltons.

In some embodiments, $R^2$ includes a carbon atom that is attached to a carbon atom of each of the phenylene groups depicted in Formula I. For example, $R^2$ can have a structure of the formula —C(R$^7$)(R$^8$)—, wherein $R^7$ and $R^8$ are each independently a hydrogen atom, a halogen atom, an organic group, a sulfur-containing group, a nitrogen-containing group, or any other suitable group that is preferably substantially non-reactive with an epoxy group, and wherein $R^7$ and $R^8$ can optionally join to form a cyclic group.

In some embodiments, at least one, and preferably both $R^7$ and $R^8$ are hydrogen atoms. In one preferred embodiment, $R^2$ is a divalent methylene group (—CH$_2$). While not intending to be bound by theory, it is believed that it may be generally desirable to avoid using an $R^2$ group wherein each of $R^7$ and $R^8$ are methyl (—CH$_3$) groups. It may also be generally desirable to avoid using an $R^2$ group in which $R^7$ and $R^8$ join to form a monocyclic cyclohexyl group.

It is also thought to be generally desirable to avoid using either of the following "constrained" unsaturated structures (i) or (ii) as $R^2$: (i) —C(R$^9$)=C(R$^9$)— or (ii) —C(=C(R$^{10}$)$_y$)—C(=C(R$^{10}$)$_y$)—, wherein y is 1 or 2 and each of $R^9$ or $R^{10}$ is independently a hydrogen atom, a halogen atom, an organic group, or a monovalent group. For example, the following unsaturated structures (i) and (ii) are preferably avoided as $R^2$: (i) —C(CH$_2$CH$_3$)=C(CH$_2$CH$_3$)— and (ii) —C(=CHCH$_3$)—C(=CHCH$_3$)—.

While not intending to be bound by theory it is believed that a suitably low atomic weight $R^2$ group such as, e.g., —CH$_2$— (14 Daltons), can help avoid estrogenic activity. In some embodiments where $R^2$ is a —C(R$^7$)(R$^8$)— group, it may be desirable that $R^2$ have an atomic weight of less than 42 Daltons or less than 28 Daltons. It is also believed that a suitably high atomic weight $R^2$ can also help interfere with the ability of a polyhydric phenol to function as an agonist for a human estrogen receptor. In some embodiments where $R^2$ is a —C(R$^7$)(R$^8$)— group, it may be desirable that $R^2$ have an atomic weight that is greater than about: 125, 150, 175, or 200 Daltons. By way of example, a polyhydric phenol compound has been determined to be appreciably non-estrogenic that: (a) is not "hindered" (e.g., v=0) and (b) has an $R^2$ group in the form of —C(R$^7$)(R$^8$)— having an atomic weight greater than 200 Daltons.

While not intending to be bound by theory, preferred $R^2$ groups include divalent groups that promote that the orientation of a polyhydric phenol compound in a three-dimensional configuration that is sufficiently different from 17β-estradiol or other compounds (e.g., diethylstilbestrol) having estrogenic activity. For example, while not intending to be bound by theory, it is believed that the presence of $R^2$ as an unsubstituted methylene bridge (—CH$_2$—) can contribute to the reduction or elimination of estrogenic activity. It is also contemplated that a singly substituted methylene bridge having one hydrogen attached to the central carbon atom of the methylene bridge (—C(R$^7$)(H)—; see, e.g., the $R^2$ group of 4,4'-butylidenebis(2-t-butyl-5-methylphenol)) may also contribute such a beneficial effect, albeit perhaps to a lesser extent.

In some embodiments, $R^2$ is of the formula —C(R$^7$)(R$^8$)— wherein $R^7$ and $R^8$ form a ring that includes one or more heteroatoms. In one such embodiment, the ring formed by $R^7$ and $R^8$ further includes one or more additional cyclic groups such as, e.g., one or more aryl cyclic groups (e.g., two phenylene rings).

In one embodiment, $R^2$ is of the formula —C(R$^7$)(R$^8$)— wherein at least one of $R^7$ and $R^8$ form a ring with an $R^1$ of the depicted phenylene group. In one such embodiment, each of $R^7$ and $R^8$ forms such a ring with a different depicted phenylene group.

In some embodiments, the segment of Formula I does not include any ester linkages in a backbone of $R^2$ connecting the pair of depicted phenylene groups.

The oxygen atom of a phenylene ring depicted in Formula I can be positioned on the ring at any position relative to $R^2$ (or relative to the other phenylene ring if $R^2$ is absent). In some embodiments, the oxygen atom (which is preferably an ether oxygen) and $R^2$ are located at para positions relative to one another. In other embodiments, the oxygen atom and $R^2$ may be located ortho or meta to one another.

The segments of Formula I can be of any suitable size. Typically, the segments of Formula I will have an atomic weight of less than 1,000, less than 600, or less than 400 Daltons. More typically, the segments of Formula I will have an atomic weight of about 100 to about 400 Daltons.

In preferred embodiments, the substituted phenylene groups of Formula I are symmetric relative to one another. Stated otherwise, the substituted phenylene groups are preferably formed from the same phenol compound, thereby resulting in the same substituent groups on each ring located at the same ring positions. An example of a compound having symmetric phenylene groups is provided below.

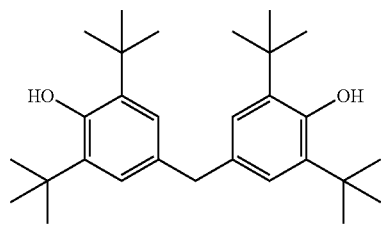 [SMILES: CC(C)(C)c1cc(Cc2cc(C(C)(C)C)c(O)c(C(C)(C)C)c2)cc(C(C)(C)C)c1O]

An example of a compound having phenylene groups that are not symmetric is provided below, in which a methyl group is at a meta position on one ring and at an ortho position on the other.

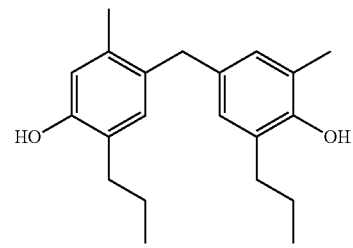 [SMILES: CCCc1cc(Cc2cc(C)c(O)c(CCC)c2)c(C)cc1O]

In preferred embodiments, the disclosed polymer includes a plurality of segments of Formula I, which are preferably dispersed throughout a backbone of the polymer, more preferably a polyether backbone. In preferred embodiments, the segments of Formula I constitute a substantial portion of the overall mass of the polymer. Typically, segments of Formula I constitute at least 10 weight percent ("wt. %"), preferably at least 30 wt. %, more preferably at least 40 wt. %, even more preferably at least 50 wt. %, and optimally at least 55 wt. % of the polymer.

The polymer may also be derived from a polyhydric phenol compound depicted in the below Formula II, wherein R', $R^2$, n, t, v, and w are as in Formula I:

[Formula II]

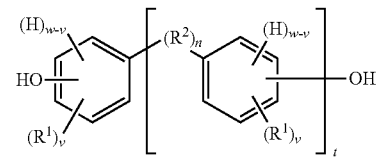

When t is 1, the compound of Formula II is of the below Formula IIA.

[Formula IIA]

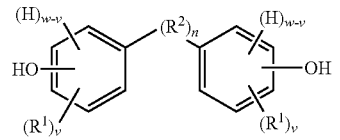

When t is 0, the compound of Formula II is of the below Formula IIB.

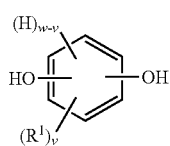

Formula (IIB)

Examples of dihydric monophenol compounds of Formula IIB include catechol and substituted catechols (e.g., 3-methylcatechol, 4-methylcatechol, 4-tert-butyl catechol, and the like); hydroquinone and substituted hydroquinones (e.g., methylhydroquinone, 2,5-dimethylhydroquinone, trimethylhydroquinone, tetramethylhydroquinone, ethylhydroquinone, 2,5-diethylhydroquinone, triethylhydroquinone, tetraethylhydroquinone, tert-butylhydroquionine, 2,5-di-tert-butylhydroquinone, and the like); resorcinol and substituted resorcinols (e.g., 2-methylresorcinol, 4-methyl resorcinol, 2,5-dimethylresorcinol, 4-ethylresorcinol, 4-butylresorcinol, 4,6-di-tert-butylresorcinol, 2,4,6-tri-tert-butylresorcinol, and the like); and variants and mixtures thereof.

Preferred compounds of Formula II do not exhibit appreciable estrogenic activity. Preferred appreciably non-estrogenic compounds exhibit a degree of estrogen agonist activity, in a competent in vitro human estrogen receptor assay, that is preferably less than that exhibited by 4,4'-(propane-2,2-diyl)polyhydric phenol in the assay, even more preferably less than that exhibited by bisphenol S in the assay, even more preferably less than that exhibited by 4,4'-(propane-2,2-diyl)bis(2,6-dibromophenol) in the assay, and optimally less than about that exhibited by 2,2-bis(4-hydroxyphenyl)propanoic acid in the assay. It has been found that compounds such as 4,4'-methylenebis(2,6-di-t-butylphenol), 2,2'-methylenebis(4-methyl-6-t-butylphenol), 4,4'-methylenebis(2,6-dimethylphenol), 4,4'butylidenebis (2-t-butyl-5-methylphenol), and 2,5-di-t-butylhydroquinone do not exhibit appreciable estrogenic activity in a suitable in vitro assay whose results are known to be directly correlated to the results of the MCF-7 cell proliferation assay (MCF-7 assay) through analysis of common reference compounds.

The MCF-7 assay is a useful test for assessing whether a polyhydric phenol compound is appreciably non-estrogenic. The MCF-7 assay uses MCF-7, clone WS8, cells to measure whether and to what extent a substance induces cell proliferation via estrogen receptor (ER)-mediated pathways. The method is described in "Test Method Nomination: MCF-7 Cell Proliferation Assay of Estrogenic Activity" submitted for validation by CertiChem, Inc. to the National Toxicology Program Interagency Center for the Evaluation of Alternative Toxicological Methods (NICEA™) on Jan. 19, 2006 (available online at iccvam.niehs.nih.gov/methods/endocrine/endodocs/SubmDoc.pdf).

A brief summary of the method of the aforementioned MCF-7 assay is provided below. MCF-7, clone WS8, cells are maintained at 37° C. in RMPI (Roswell Park Memorial Institute medium) containing Phenol Red (e.g., GIBCO Catalog Number 11875119) and supplemented with the indicated additives for routine culture. An aliquot of cells maintained at 37° C. are grown for two days in phenol-free media containing 5% charcoal stripped fetal bovine serum in a 25 $cm^2$ tissue culture flask. Using a robotic dispenser such as an EPMOTION™ 5070 unit from Eppendorf AG, MCF-7 cells are then seeded at 400 cells per well in 0.2 ml of hormone-free culture medium in CORNING™ 96-well plates from Corning Life Sciences. The cells are adapted for 3 days in the hormone-free culture medium prior to adding the chemical to be assayed for estrogenic activity. The media containing the test chemical is replaced daily for 6 days. At the end of the 7 day exposure to the test chemical, the media is removed, the wells are washed once with 0.2 ml of HBSS (Hanks' Balanced Salt Solution), and then assayed to quantify amounts of DNA per well using a micro-plate modification of the Burton diphenylamine (DPA) assay, which is used to calculate the level of cell proliferation.

Examples of appreciably non-estrogenic polyhydric phenols include polyhydric phenols that, when tested using the MCF-7 assay, exhibit a Relative Proliferative Effect (RPE) having a logarithmic value (with base 10) of less than about −2.0, more preferably an RPE of −3 or less, and even more preferably an RPE of −4 or less. RPE is the ratio between the EC50 of the test chemical and the EC50 of the control substance 17-beta estradiol times 100, where EC50 is "effective concentration 50%" or half-maximum stimulation concentration for cell proliferation measured as total DNA in the MCF-7 assay.

Table I shown below includes exemplary preferred polyhydric phenol compounds of Formula II and their expected or measured logarithmic RPE values in the MCF-7 assay.

TABLE 1

| Polyhydric Compound of Formula II | Structure | Reference Compound | Log RPE |
|---|---|---|---|
|  |  | 17β-estradiol | 2.00 |
|  |  | diethylstilbestrol | about 2 |
|  |  | dienestrol | about 2 |
|  |  | Genistein | −2 |
|  |  | Bisphenol S | −2 |
|  |  | Bisphenol F | −2 |
| 4,4'-isopropylidenebis(2,6-dimethylphenol) | 1 |  | −2 |
| 4,4'-(propane-2,2-diyl)bis(2,6-dibromophenol) | 16 |  | −3 |
| 4,4'-(ethane-1,2-diyl)bis(2,6-dimethylphenol) | 2 |  | −3 |
| 4,4',4''-(ethane-1,1,1-triyl)triphenol | 3 |  | −3 |
| 4,4'-(1-phenylethane-1,1-diyl)polyhydric phenol | 4 |  | −3 |
| 2,2-bis(4-hydroxyphenyl)propanoic acid | 5 |  | less than −4 |
| 4,4'-methylenebis(2,6-dimethylphenol) | 6 |  | less than −4 |

TABLE 1-continued

| Polyhydric Compound of Formula II | Structure | Reference Compound | Log RPE |
|---|---|---|---|
| 4,4'-butylidenebis(2-t-butyl-5-methylphenol) | 7 | | less than −4 |
| 4,4'-methylenebis(2,6-di-t-butylphenol) | 8 | | less than −4 |
| 2,2'-methylenebis(4-methyl-6-t-butylphenol | 9 | | less than −4 |
| 4,4'-(1,4-phenylenebis(propane-2,2-diyl))polyhydric phenol | 10 | | less than −4 |
| 2,2'methylenebis(phenol) | 11 | | less than −4 |
| 2,5-di-t-butylhydroquinone | 12 | | less than −4 |
| 2,2'-Methylenebis(6-(1-methylcyclohexyl)-4-methylphenol | 13 | | less than −4 |
| 2,2'-Methylenebis(6-t-butyl-4-methylphenol) | 14 | | less than −4 |
| 2,2'Methylenebis(4-ethyl-6-t-butylphenol) | 15 | | less than −4 |

Structures 1 through 16 as identified in Table 1 are also shown below:

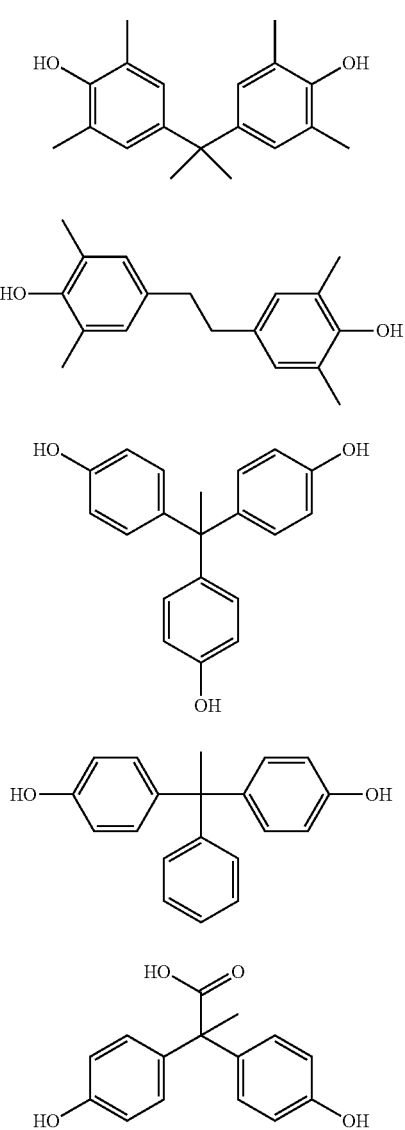
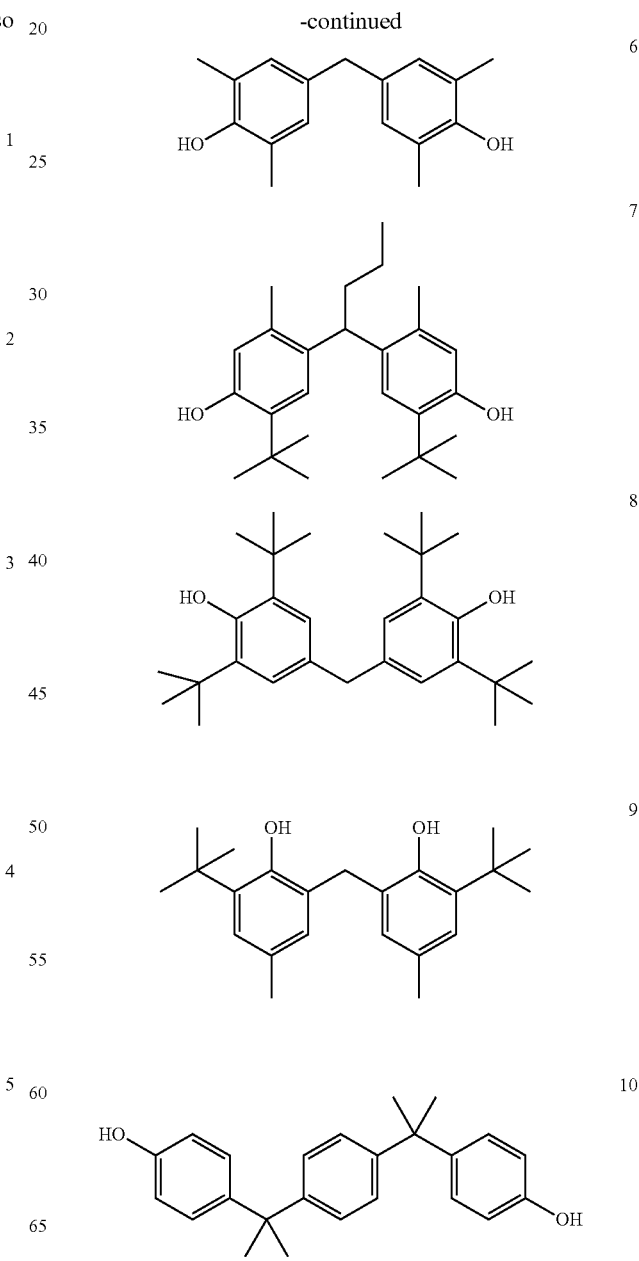

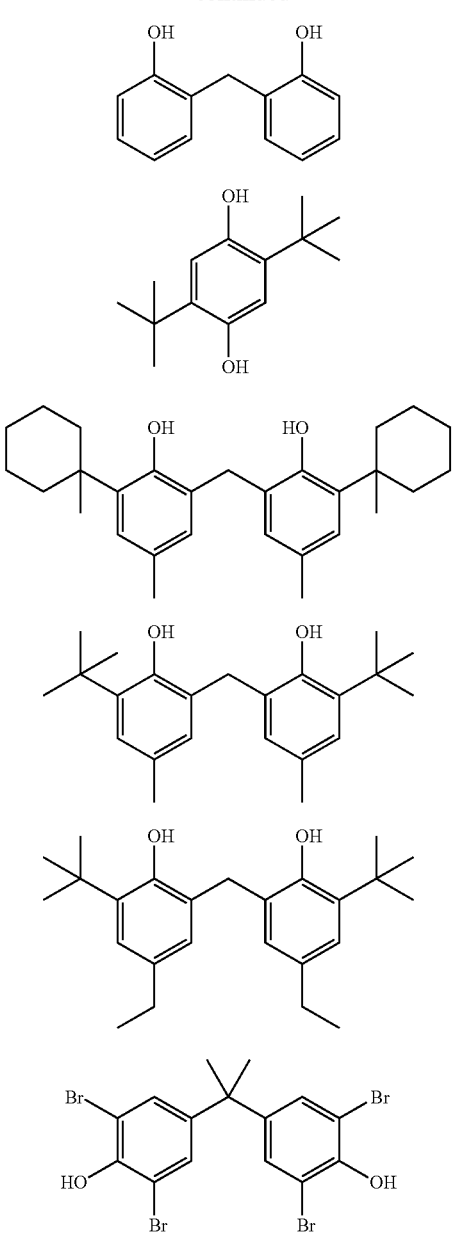

Compounds having no appreciable estrogenic activity may be beneficial in the event that any unreacted, residual compound may be present in a coating composition. While the balance of scientific data does not indicate that the presence in cured coatings of very small amounts of residual compounds having estrogenic activity (as measured, for example, in an in vitro recombinant cell assay) pose a human health concern, the use of compounds having no appreciable estrogenic activity in such an assay may nonetheless be desirable from a public perception standpoint. Thus, in preferred embodiments, the disclosed polymer is preferably formed using polyhydric phenol compounds that do not exhibit appreciable estrogenic activity in the MCF-7 test.

While not intending to be bound by theory, as previously discussed, it is believed that the presence of substituent groups (e.g., a group other than a hydrogen atom) at one or more of the ortho or meta positions of each phenylene ring of the Formula II compound, relative to the phenol hydroxyl group of each ring, can reduce or effectively eliminate any estrogenic activity. It is believed that the inhibition/elimination of estrogenic activity may be attributable to one or more of the following: (a) steric hindrance of the phenol hydroxyl group (which may cause the overall polyhydric phenol structure to be sufficiently different from estrogenically active compounds such as diethylstilbestrol), (b) the compound having an increased molecular weight due to the presence of the one or more substituent groups, (c) the presence of polar groups or (d) the presence of ortho hydroxyl groups relative to $R^2$. Substitution at one or both of the ortho positions of each phenylene ring is presently preferred for certain embodiments as it is believed that ortho substitution can provide the greatest steric hindrance for the hydroxyl group.

As previously discussed, structural features other than the presence of suitable $R^1$ groups (e.g., features such as (b), (c), and (d) of the preceding paragraph) are believed to inhibit or eliminate estrogenic activity, even in the absence of any $R^1$ groups.

It is believed that molecular weight may be a structural characteristic pertinent to whether a polyhydric phenol is appreciably non-estrogenic. For example, while not intending to be bound by theory, it is believed that if a sufficient amount of relatively "densely" packed molecular weight is present in a polyhydric phenol, it can prevent the compound from being able to fit into the active site of an estrogen receptor (irrespective of whether the polyhydric phenol includes any ortho or meta $R^1$ groups). In some embodiments, it may be beneficial to form a polyether polymer from one or more polyhydric phenols (whether "hindered" or not) that includes at least the following number of carbon atoms: 20, 21, 22, 23, 24, 25, or 26 carbon atoms. In one such embodiment, a polyhydric phenol of Formula II is used to make the polyether polymer, where (a) v is independently 0 to 4 and (b) $R^2$ is of the formula —$C(R^7)(R^8)$— and includes at least 8, at least 10, at least 12, or at least 14 carbon atoms (or otherwise has an $R^2$ of sufficiently high atomic weight to prevent the compound from fitting into the active site).

The presence of one or more polar groups on the polyhydric phenol compounds of Formula II may be beneficial in making the disclosed compositions, particularly when certain embodiments of Formula IIA are employed. The polar groups may be located at any suitable location of the compounds of Formula II, including in $R^1$ or $R^2$. Suitable polar groups may include ketone, carboxyl, carbonate, hydroxyl, phosphate, sulfoxide, and the like, any other polar groups disclosed herein, and combinations thereof.

The below compounds of Formula II may also be used to make certain embodiments of the disclosed compositions if desired.

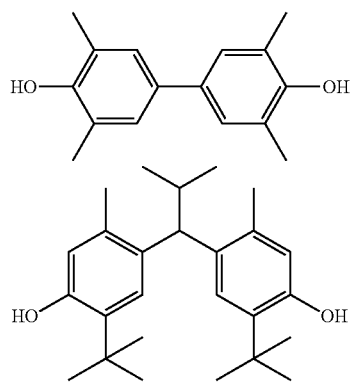

-continued

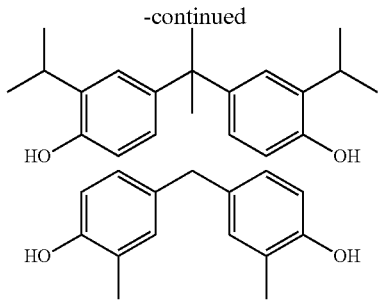

The below compounds are not presently preferred, but may be used to make certain embodiments, if desired.

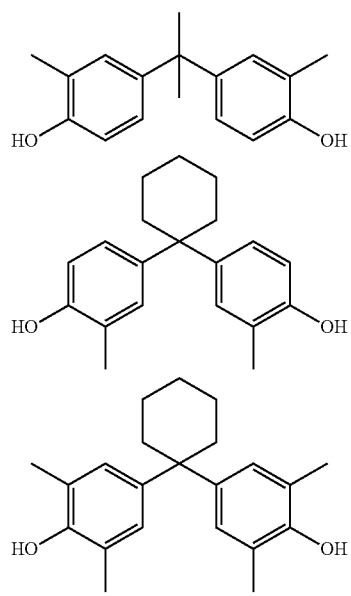

Additional polyhydric phenol compounds that may have utility in making the disclosed compositions are provided below. While the polyhydric phenol structures listed below are not "hindered" in the sense of having bulky substituent groups at one or more ortho or meta positions of the phenylene ring(s), it is contemplated that each of the below polyhydric phenol structures may be used in place of, or in addition to, compounds of Formula II that are "hindered" polyhydric phenols. Such hindered compounds are believed to be appreciably non-estrogenic for one or more of the reasons previously described herein.

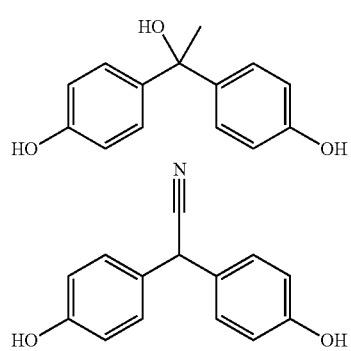

-continued

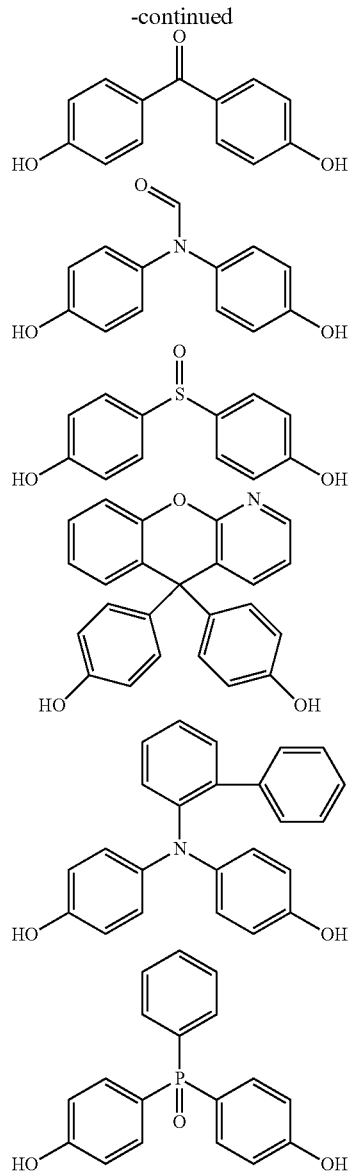

Segments of Formula I and compounds of Formula II wherein each of the depicted phenylene groups include one or two ortho $R^1$ groups (relative to the depicted oxygen atom) are presently preferred for making the disclosed compositions. To further illustrate such structures, Table 2 shown below exemplifies some non-limiting combinations of one or more ortho $R^1$ and $R^2$, if present, for a given phenylene group. Table 2 is non-limiting with respect to the ring position of $R^2$ (e.g., ortho, meta, para), although typically $R^2$, if present, will be located at a para position relative to the oxygen atom. The columns labeled "Ortho Position A" and "Ortho Position B" indicate the $R^1$ group present at each ortho position of the phenylene group (assuming $R^2$ is not located at an ortho position). Positions "A" or "B" can be either ortho position relative to the depicted oxygen atom. If $R^2$ is located at an ortho position of the phenylene group, then the group listed in the "Ortho Position B" column is not present. Typically, though not required, the phenylene groups in a given segment of Formula I or compound of Formula II will be "symmetric" relative to the second phenylene group such that the same ortho group (as delineated in the ortho position column "A" or "B") is located on each ring at the same ortho position.

Table 2 is also intended as a listing of independent examples of $R^1$ or $R^2$, as well as examples of combinations of $R^1$ and $R^2$ (regardless of whether $R^1$ is ortho or meta relative to the oxygen atom, whether other $R^1$ are present in a particular phenylene group, or whether the one or more $R^1$ are the same for both of the phenylene groups).

TABLE 2

| Ortho Position "A" | Ortho Position "B" | $R^2$ |
|---|---|---|
| Butyl | Hydrogen | 2-Butylidene |
| Butyl | Methyl | 2-Butylidene |
| Butyl | Ethyl | 2-Butylidene |
| Butyl | Propyl | 2-Butylidene |
| Butyl | isopropyl | 2-Butylidene |
| Butyl | Butyl | 2-Butylidene |
| Ethyl | Hydrogen | 2-Butylidene |
| Ethyl | Methyl | 2-Butylidene |
| Ethyl | Ethyl | 2-Butylidene |
| Isopropyl | Hydrogen | 2-Butylidene |
| Isopropyl | Methyl | 2-Butylidene |
| Isopropyl | Ethyl | 2-Butylidene |
| Isopropyl | Propyl | 2-Butylidene |
| Isopropyl | isopropyl | 2-Butylidene |
| Methyl | Hydrogen | 2-Butylidene |
| Methyl | Methyl | 2-Butylidene |
| Propyl | Hydrogen | 2-Butylidene |
| Propyl | Methyl | 2-Butylidene |
| Propyl | Ethyl | 2-Butylidene |
| Propyl | Propyl | 2-Butylidene |
| sec-Butyl | Hydrogen | 2-Butylidene |
| sec-Butyl | Methyl | 2-Butylidene |
| sec-Butyl | Ethyl | 2-Butylidene |
| sec-Butyl | Propyl | 2-Butylidene |
| sec-Butyl | isopropyl | 2-Butylidene |
| sec-Butyl | Butyl | 2-Butylidene |
| sec-Butyl | sec-Butyl | 2-Butylidene |
| tert-Butyl | Hydrogen | 2-Butylidene |
| tert-Butyl | Methyl | 2-Butylidene |
| tert-Butyl | Ethyl | 2-Butylidene |
| tert-Butyl | Propyl | 2-Butylidene |
| tert-Butyl | isopropyl | 2-Butylidene |
| tert-Butyl | Butyl | 2-Butylidene |
| tert-Butyl | sec-Butyl | 2-Butylidene |
| tert-Butyl | tert-Butyl | 2-Butylidene |
| Butyl | Hydrogen | Butylene |
| Butyl | Methyl | Butylene |
| Butyl | Ethyl | Butylene |
| Butyl | Propyl | Butylene |
| Butyl | isopropyl | Butylene |
| Butyl | Butyl | Butylene |
| Ethyl | Hydrogen | Butylene |
| Ethyl | Methyl | Butylene |
| Ethyl | Ethyl | Butylene |
| Isopropyl | Hydrogen | Butylene |
| Isopropyl | Methyl | Butylene |
| Isopropyl | Ethyl | Butylene |
| Isopropyl | Propyl | Butylene |
| Isopropyl | isopropyl | Butylene |
| Methyl | Hydrogen | Butylene |
| Methyl | Methyl | Butylene |
| Propyl | Hydrogen | Butylene |
| Propyl | Methyl | Butylene |
| Propyl | Ethyl | Butylene |
| Propyl | Propyl | Butylene |
| sec-Butyl | Hydrogen | Butylene |
| sec-Butyl | Methyl | Butylene |
| sec-Butyl | Ethyl | Butylene |
| sec-Butyl | Propyl | Butylene |
| sec-Butyl | isopropyl | Butylene |
| sec-Butyl | Butyl | Butylene |
| sec-Butyl | sec-Butyl | Butylene |
| tert-Butyl | Hydrogen | Butylene |
| tert-Butyl | Methyl | Butylene |
| tert-Butyl | Ethyl | Butylene |
| tert-Butyl | Propyl | Butylene |
| tert-Butyl | isopropyl | Butylene |
| tert-Butyl | Butyl | Butylene |
| tert-Butyl | sec-Butyl | Butylene |
| tert-Butyl | tert-Butyl | Butylene |
| Butyl | Hydrogen | Ethylidene |
| Butyl | Methyl | Ethylidene |
| Butyl | Ethyl | Ethylidene |
| Butyl | Propyl | Ethylidene |
| Butyl | isopropyl | Ethylidene |
| Butyl | Butyl | Ethylidene |
| Ethyl | Hydrogen | Ethylidene |
| Ethyl | Methyl | Ethylidene |
| Ethyl | Ethyl | Ethylidene |
| Isopropyl | Hydrogen | Ethylidene |
| Isopropyl | Methyl | Ethylidene |
| Isopropyl | Ethyl | Ethylidene |
| Isopropyl | Propyl | Ethylidene |
| Isopropyl | isopropyl | Ethylidene |
| Methyl | Hydrogen | Ethylidene |
| Methyl | Methyl | Ethylidene |
| Propyl | Hydrogen | Ethylidene |
| Propyl | Methyl | Ethylidene |
| Propyl | Ethyl | Ethylidene |
| Propyl | Propyl | Ethylidene |
| sec-Butyl | Hydrogen | Ethylidene |
| sec-Butyl | Methyl | Ethylidene |
| sec-Butyl | Ethyl | Ethylidene |
| sec-Butyl | Propyl | Ethylidene |
| sec-Butyl | isopropyl | Ethylidene |
| sec-Butyl | Butyl | Ethylidene |
| sec-Butyl | sec-Butyl | Ethylidene |
| tert-Butyl | Hydrogen | Ethylidene |
| tert-Butyl | Methyl | Ethylidene |
| tert-Butyl | Ethyl | Ethylidene |
| tert-Butyl | Propyl | Ethylidene |
| tert-Butyl | isopropyl | Ethylidene |
| tert-Butyl | Butyl | Ethylidene |
| tert-Butyl | sec-Butyl | Ethylidene |
| tert-Butyl | tert-Butyl | Ethylidene |
| Butyl | Hydrogen | Methylidene |
| Butyl | Methyl | Methylidene |
| Butyl | Ethyl | Methylidene |
| Butyl | Propyl | Methylidene |
| Butyl | isopropyl | Methylidene |
| Butyl | Butyl | Methylidene |
| Ethyl | Hydrogen | Methylidene |
| Ethyl | Methyl | Methylidene |
| Ethyl | Ethyl | Methylidene |
| Isopropyl | Hydrogen | Methylidene |
| Isopropyl | Methyl | Methylidene |
| Isopropyl | Ethyl | Methylidene |
| Isopropyl | Propyl | Methylidene |
| Isopropyl | isopropyl | Methylidene |
| Methyl | Hydrogen | Methylidene |
| Methyl | Methyl | Methylidene |
| Propyl | Hydrogen | Methylidene |
| Propyl | Methyl | Methylidene |
| Propyl | Ethyl | Methylidene |
| Propyl | Propyl | Methylidene |
| sec-Butyl | Hydrogen | Methylidene |
| sec-Butyl | Methyl | Methylidene |
| sec-Butyl | Ethyl | Methylidene |
| sec-Butyl | Propyl | Methylidene |
| sec-Butyl | isopropyl | Methylidene |
| sec-Butyl | Butyl | Methylidene |
| sec-Butyl | sec-Butyl | Methylidene |
| tert-Butyl | Hydrogen | Methylidene |
| tert-Butyl | Methyl | Methylidene |
| tert-Butyl | Ethyl | Methylidene |
| tert-Butyl | Propyl | Methylidene |
| tert-Butyl | isopropyl | Methylidene |
| tert-Butyl | Butyl | Methylidene |
| tert-Butyl | sec-Butyl | Methylidene |
| tert-Butyl | tert-Butyl | Methylidene |
| Butyl | Hydrogen | Propylidene |
| Butyl | Methyl | Propylidene |
| Butyl | Ethyl | Propylidene |
| Butyl | Propyl | Propylidene |
| Butyl | isopropyl | Propylidene |

TABLE 2-continued

| Ortho Position "A" | Ortho Position "B" | R² |
|---|---|---|
| Butyl | Butyl | Propylidene |
| Ethyl | Hydrogen | Propylidene |
| Ethyl | Methyl | Propylidene |
| Ethyl | Ethyl | Propylidene |
| Isopropyl | Hydrogen | Propylidene |
| Isopropyl | Methyl | Propylidene |
| Isopropyl | Ethyl | Propylidene |
| Isopropyl | Propyl | Propylidene |
| Isopropyl | isopropyl | Propylidene |
| Methyl | Hydrogen | Propylidene |
| Methyl | Methyl | Propylidene |
| Propyl | Hydrogen | Propylidene |
| Propyl | Methyl | Propylidene |
| Propyl | Ethyl | Propylidene |
| Propyl | Propyl | Propylidene |
| sec-Butyl | Hydrogen | Propylidene |
| sec-Butyl | Methyl | Propylidene |
| sec-Butyl | Ethyl | Propylidene |
| sec-Butyl | Propyl | Propylidene |
| sec-Butyl | isopropyl | Propylidene |
| sec-Butyl | Butyl | Propylidene |
| sec-Butyl | sec-Butyl | Propylidene |
| tert-Butyl | Hydrogen | Propylidene |
| tert-Butyl | Methyl | Propylidene |
| tert-Butyl | Ethyl | Propylidene |
| tert-Butyl | Propyl | Propylidene |
| tert-Butyl | isopropyl | Propylidene |
| tert-Butyl | Butyl | Propylidene |
| tert-Butyl | sec-Butyl | Propylidene |
| tert-Butyl | tert-Butyl | Propylidene |
| Butyl | Hydrogen | 1-Phenylethylidene |
| Butyl | Methyl | 1-Phenylethylidene |
| Butyl | Ethyl | 1-Phenylethylidene |
| Butyl | Propyl | 1-Phenylethylidene |
| Butyl | isopropyl | 1-Phenylethylidene |
| Butyl | Butyl | 1-Phenylethylidene |
| Ethyl | Hydrogen | 1-Phenylethylidene |
| Ethyl | Methyl | 1-Phenylethylidene |
| Ethyl | Ethyl | 1-Phenylethylidene |
| Isopropyl | Hydrogen | 1-Phenylethylidene |
| Isopropyl | Methyl | 1-Phenylethylidene |
| Isopropyl | Ethyl | 1-Phenylethylidene |
| Isopropyl | Propyl | 1-Phenylethylidene |
| Isopropyl | isopropyl | 1-Phenylethylidene |
| Methyl | Hydrogen | 1-Phenylethylidene |
| Methyl | Methyl | 1-Phenylethylidene |
| Propyl | Hydrogen | 1-Phenylethylidene |
| Propyl | Methyl | 1-Phenylethylidene |
| Propyl | Ethyl | 1-Phenylethylidene |
| Propyl | Propyl | 1-Phenylethylidene |
| sec-Butyl | Hydrogen | 1-Phenylethylidene |
| sec-Butyl | Methyl | 1-Phenylethylidene |
| sec-Butyl | Ethyl | 1-Phenylethylidene |
| sec-Butyl | Propyl | 1-Phenylethylidene |
| sec-Butyl | isopropyl | 1-Phenylethylidene |
| sec-Butyl | Butyl | 1-Phenylethylidene |
| sec-Butyl | sec-Butyl | 1-Phenylethylidene |
| tert-Butyl | Hydrogen | 1-Phenylethylidene |
| tert-Butyl | Methyl | 1-Phenylethylidene |
| tert-Butyl | Ethyl | 1-Phenylethylidene |
| tert-Butyl | Propyl | 1-Phenylethylidene |
| tert-Butyl | isopropyl | 1-Phenylethylidene |
| tert-Butyl | Butyl | 1-Phenylethylidene |
| tert-Butyl | sec-Butyl | 1-Phenylethylidene |
| tert-Butyl | tert-Butyl | 1-Phenylethylidene |
| Butyl | Hydrogen | Diphenylmethylidene |
| Butyl | Methyl | Diphenylmethylidene |
| Butyl | Ethyl | Diphenylmethylidene |
| Butyl | Propyl | Diphenylmethylidene |
| Butyl | isopropyl | Diphenylmethylidene |
| Butyl | Butyl | Diphenylmethylidene |
| Ethyl | Hydrogen | Diphenylmethylidene |
| Ethyl | Methyl | Diphenylmethylidene |
| Ethyl | Ethyl | Diphenylmethylidene |
| Isopropyl | Hydrogen | Diphenylmethylidene |
| Isopropyl | Methyl | Diphenylmethylidene |
| Isopropyl | Ethyl | Diphenylmethylidene |
| Isopropyl | Propyl | Diphenylmethylidene |
| Isopropyl | isopropyl | Diphenylmethylidene |
| Methyl | Hydrogen | Diphenylmethylidene |
| Methyl | Methyl | Diphenylmethylidene |
| Propyl | Hydrogen | Diphenylmethylidene |
| Propyl | Methyl | Diphenylmethylidene |
| Propyl | Ethyl | Diphenylmethylidene |
| Propyl | Propyl | Diphenylmethylidene |
| sec-Butyl | Hydrogen | Diphenylmethylidene |
| sec-Butyl | Methyl | Diphenylmethylidene |
| sec-Butyl | Ethyl | Diphenylmethylidene |
| sec-Butyl | Propyl | Diphenylmethylidene |
| sec-Butyl | isopropyl | Diphenylmethylidene |
| sec-Butyl | Butyl | Diphenylmethylidene |
| sec-Butyl | sec-Butyl | Diphenylmethylidene |
| tert-Butyl | Hydrogen | Diphenylmethylidene |
| tert-Butyl | Methyl | Diphenylmethylidene |
| tert-Butyl | Ethyl | Diphenylmethylidene |
| tert-Butyl | Propyl | Diphenylmethylidene |
| tert-Butyl | isopropyl | Diphenylmethylidene |
| tert-Butyl | Butyl | Diphenylmethylidene |
| tert-Butyl | sec-Butyl | Diphenylmethylidene |
| tert-Butyl | tert-Butyl | Diphenylmethylidene |

The backbone of the disclosed polymer may include any suitable terminal groups, including, for example, epoxy groups, hydroxyl groups (e.g., a hydroxyl group attached to a terminal aryl or heteroaryl ring) or a combination thereof.

If desired, the backbone of the disclosed polymer may include step-growth linkages (e.g., condensation linkages) other than ether linkages (e.g., in addition to, or in place of, the ether linkages) such as, for example, amide linkages, carbonate linkages, ester linkages, urea linkages, urethane linkages, etc. Thus, for example, in some embodiments, the backbone may include both ester and ether linkages. In some embodiments, the backbone of the polymer does not include any condensation linkages or other step-growth linkages other than ether linkages.

The disclosed polymer preferably includes hydroxyl groups. In preferred embodiments, the polymer includes a plurality of hydroxyl groups attached to the backbone. In preferred embodiments, polyether portions of the polymer backbone include secondary hydroxyl groups distributed throughout. Preferred secondary hydroxyl groups are present in —CH$_2$—CH(OH)—CH$_2$— or —CH$_2$—CH$_2$—CH(OH)— segments, which are preferably derived from an oxirane group. Such segments may be formed, for example, via reaction of an oxirane group and a hydroxyl group (preferably a hydroxyl group of a polyhydric phenol). In some embodiments, CH$_2$—CH(OH)—CH$_2$— or CH$_2$—CH$_2$—CH(OH)— segments are attached to each of the ether oxygen atoms of preferred segments of Formula I.

Although any suitable ingredients may be used to form the polymer, in presently preferred embodiments, the polymer is formed via reaction of ingredients that include: (a) one or more polyepoxides, more preferably one or more diepoxides, and (b) one or more polyols, more preferably one or more polyhydric phenols, and even more preferably one or more dihydric phenols. The polymer is preferably derived from ingredients including one or more "hindered" phenylene groups described herein (e.g., as depicted in Formula I).

The epoxy groups (also commonly referred to as "oxirane" groups) of the polyepoxide compound may be attached to the compound via any suitable linkage, including, for example, ether-containing or ester-containing linkages. Glycidyl ethers of polyhydric phenols and glycidyl esters of polyhydric phenols are preferred polyepoxide compounds, with diglycidyl ethers being particularly preferred.

A preferred polyepoxide compound for use in incorporating segments of Formula I into the disclosed polymer is depicted in Formula III below:

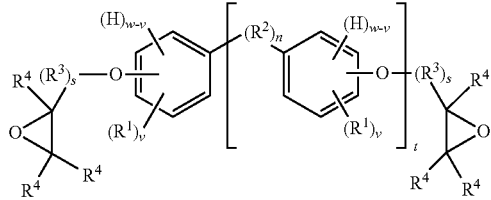

[Formula III]

wherein:

$R^1$, $R^2$, n, t, v, and w are as described above for Formula I;

s is 0 to 1, more preferably 1;

$R^3$, if present, is a divalent group, more preferably a divalent organic group; and preferably each $R^4$ is independently a hydrogen atom, a halogen atom, or a hydrocarbon group that may include one or more heteroatoms; more preferably each $R^4$ is a hydrogen atom.

When t is 1, the polyepoxide of Formula III is a segment of Formula IIIA below:

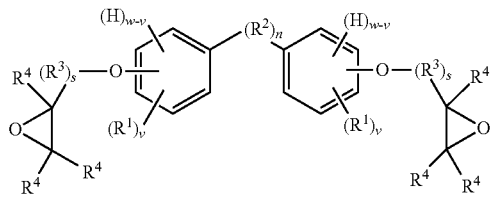

[Formula IIIA]

When t is 0, the polyepoxide of Formula II is a segment of Formula IIIB below:

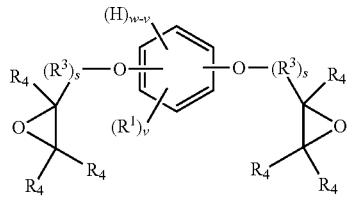

[Formula IIIB]

$R^3$ is typically a hydrocarbyl group, which may optionally include one or more heteroatoms. Preferred hydrocarbyl groups include groups having from one to four carbon atoms, with methylene groups being particularly preferred. In some embodiments, $R^3$ includes a carbonyl group. In one such embodiment, $R^3$ includes a carbonyl group that is attached to the oxygen atom depicted in Formula III (e.g., as in an ester linkage).

In presently preferred embodiments, $R^4$ is a hydrogen atom.

Preferred polyepoxide compounds of Formula III are non-mutagenic, more preferably non-genotoxic. A useful test for assessing both mutagenicity and genotoxicity is the mammalian in vivo assay known as the in vivo alkaline single cell gel electrophoresis assay (referred to as the "comet" assay). The method is described in Tice, R. R. "The single cell gel/comet assay: a microgel electrophoretic technique for the detection of DNA damage and repair in individual cells." *Environmental Mutagenesis*. Eds. Phillips, D. H. and Venitt, S. Bios Scientific, Oxford, UD, 1995, pp. 315-339. A negative test result in the comet assay indicates that a compound is non-genotoxic and, therefore, non-mutagenic, though a positive test does not definitively indicate the opposite and in such cases a more definitive test may be utilized (e.g., a two-year rat feeding study).

If t of Formula III is 0, v is preferably 1 or more, more preferably 2 or more. While not intending to be bound by any theory, it is believed that the presence of one or more $R^1$ groups, and particularly one or more ortho $R^1$ groups, can contribute to the diepoxide of Formula IIIB being non-genotoxic. By way of example, 2,5-di-tert-butylhydroquinone is non-genotoxic.

The polyhydric phenol compounds of Formula II can be converted to a diepoxide using any suitable process and materials. The use of epichlorohydrin in the epoxidation process is presently preferred. By way of example, below is a diepoxide formed via an epichlorohydrin epoxidation of 4,4'-methylenebis(2,6-di-t-butylphenol).

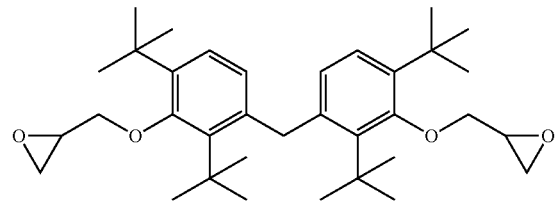 [SMILES: CC(C)(C)c1ccc(Cc2ccc(C(C)(C)C)c(OCC3CO3)c2C(C)(C)C)c(C(C)(C)C)c1OCC1CO1]

Numerous diepoxides have been successfully generated using various polyhydric phenol compounds of Formula II, and polyether polymers have been successfully produced therefrom. In general, it is much more difficult to successfully form a polyether polymer (using reasonable process times and conditions) using, as a polyhydric phenol component, a compound of Formula II substituted at the ortho ring positions. For example, the inventors have found it difficult using conventional industrial processes to efficiently react 4,4'-methylenebis(2,6-di-t-butylphenol) with diepoxide monomer to form a polyether polymer. Somewhat surprisingly, however, polyhydric phenol compounds such as 4,4'-methylenebis(2,6-di-t-butylphenol) can undergo a condensation reaction with epichlorohydrin to form a diepoxide that is reactive with conventional polyhydric phenols that are not substituted at the ortho or meta positions. While not wishing to be bound by theory, it is believed that the hydroxyl groups of such polyhydric phenol compounds are generally not sufficiently accessible to efficiently react with an oxirane group of a diepoxide monomer and form an ether linkage. Nonetheless, it is contemplated that a "hindered" polyhydric phenol compound of Formula II may be selected such that the hydroxyl groups are sufficiently sterically hindered so that the compound does not exhibit appreciable estrogenic activity, while the hydroxyl groups are still sufficiently accessible so that the compound can react with a diepoxide and build molecular weight under reasonable process times and conditions (e.g., less than 24 hours of reaction time at a reaction temperature of less than about 240° C.).

In certain preferred embodiments, the polyhydric phenol compound of Formula II is substituted at one or both ortho ring positions of each depicted phenylene group with an $R^1$ group that includes from 1 to 4 carbon atoms, more preferably from 1 to 3 carbon atoms, and even more preferably 1 to 2 carbon atoms. In some embodiments, methyl groups are preferred ortho $R^1$ groups, with the methyl moiety (e.g., —$CH_3$) being particularly preferred. While not intending to be bound by theory, it has been observed that the presence of large ortho substituent groups can sometimes affect the efficiency by which certain polyhydric phenol compounds of Formula II are converted into diepoxides using epichlorohydrin and, moreover, the efficiency by which the resulting diepoxide can be upgraded into a polyether polymer having segments of Formula I.

Any suitable upgrade polyhydric phenol may be used in forming the disclosed polymer. Preferred upgrade polyhydric phenols are free of bisphenol A and preferably do not exhibit appreciable estrogenic activity. Examples of suitable upgrade polyhydric phenols for use in forming the polyether polymer include any of the compounds of Formula II, with compounds of Formula II in which the hydroxyl group are unhindered by adjacent R groups being generally preferred for purposes of reaction efficiency. In certain preferred embodiments, the polyepoxides of Formula IIIB are upgraded with polyhydric monophenols of Formula IIB. Some specific examples of suitable upgrade polyhydric monophenols include hydroquinone, catechol, p-tert-butyl catechol, resorcinol, or a mixture thereof. Hydroquinone is a presently preferred compound.

In some embodiments, the upgrade polyhydric phenol is a compound of Formula II and includes an $R^2$ group having one or more cyclic groups (e.g., alicyclic or aromatic groups), which may be monocyclic or polycyclic groups (e.g., a divalent norbornane, norbornene, tricyclodecane, bicyclo[4.4.0] decane, or isosorbide group, or a combination thereof). In some embodiments, $R^2$ of the upgrade polyhydric phenol includes one or more ester linkages. For example, in some embodiments, $R^2$ is a —$R^6_w$—Z—$R^5$—Z—$R^6_w$-segment, where $R^5$ is a divalent organic group; each $R^6$, if present, is independently a divalent organic group; each Z is independently an ester linkage that can be of either directionality (e.g., —C(O)—O— or —O—C(O)— and each w is independently 0 or 1. In one such embodiment, $R^5$ includes at least one divalent cyclic group such as, for example, a divalent polycyclic group, a divalent aryl or heteroarylene group (e.g., a substituted or unsubstituted phenylene group) or a divalent alicyclic group (e.g., a substituted or unsubstituted cyclohexane or cyclohexene group). In one embodiment, $R^2$ is —$R^6_w$—C(O)—O—$R^5$—OC(O)—$R^6_w$—. For further discussion of suitable segments containing ester linkages and materials for incorporating such segments into the disclosed polymer, see U.S. Published Application No. 2007/0087146 to Evans et. al. and Published International Application No. WO 2011/130671 to Niederst et al.

By way of example, an upgrade polyhydric phenol having a cyclic-group-containing $R^2$ may be formed by reacting (a) a suitable amount (e.g., about 2 moles) of a Compound A having a phenol hydroxyl group and a carboxylic acid or other active hydrogen group with (b) a suitable amount (e.g., about 1 mole) of a di-functional or higher Compound B having one or more cyclic groups (monocyclic or polycyclic) and two or more active hydrogen groups capable of reacting with the active hydrogen group of Compound A. Examples of preferred Compounds A include 4-hydroxy phenyl acetic acid, 3-hydroxybenzoic acid, 4-hydroxybenzoic acid, and derivatives or mixtures thereof. Examples of preferred Compounds B include cyclic-containing diols such as cyclohexane dimethanol (CHDM); tricyclodecane dimethanol (TCDM); 2,2,4,4-tetramethyl-1,3-cyclobutanediol; a polycyclic anhydrosugar such as isosorbide, isomannide, or isoidide; and derivatives or mixtures thereof. In some embodiments, the cyclic group may be formed after reaction of Compounds A and B. For example, a Diels-Alder reaction (using, e.g., cyclopentadiene as a reactant) could be used to incorporate an unsaturated bicyclic group such as a norbornene group into Compound B, in which case Compound B in its unreacted form would need to include at least one non-aromatic carbon-carbon double bond in order to participate in the Diels-Alder reaction. For further discussion of suitable materials and techniques relating to such Diels-Alder reactions see, for example, Published International App. Nos. WO 2010/118356 to Skillman et al. and WO 2010/118349 to Hayes et al.

Some examples of cyclic-group-containing and ester-link-containing upgrade polyhydric phenol compounds are provided below. These compounds are discussed in further detail in the previously referenced Published International Application No. WO 2011/130671 to Niederst et al.

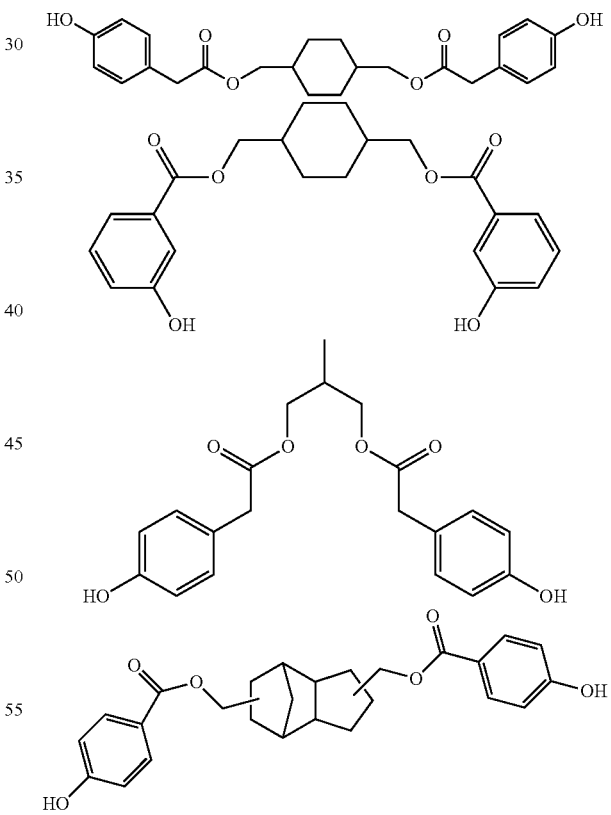

It is also contemplated that the disclosed polymer may be formed via reaction of ingredients including the polyhydric phenol compound of Formula II and a diepoxide other than that of Formula III. Examples of such compounds include compounds such as 1,4-cyclohexanedimethanol digylcidyl ether (CHDMDGE), neopentyl glycol digylcidyl ether, 2-methy-1,3-propanediol diglycidyl ether, tricyclodecane dimethanol diglycidyl ether, and combinations thereof. While not intending to be bound by theory, some such aliphatic diepoxides (e.g., CHDMDGE and neopentyl glycol digylcidyl ether) that tend to yield polymers having lower Tg values may not be suitable for certain interior packaging coating applications in which a relatively high Tg polymer is desirable for purposes of corrosion resistance, although they may be suitable for exterior packaging coating applications or other end uses.

If desired, one or more comonomers or co-oligomers may be included in the reactants used to generate the disclosed polymer. Non-limiting examples of such materials include adipic acid, azelaic acid, terephthalic acid, isophthalic acid, and combinations thereof. The comonomers or co-oligomers may be included in an initial reaction mixture of polyepoxide and polyhydric phenol or may be post-reacted with the resulting polyether oligomer or polymer.

The disclosed polymers may be made in a variety of molecular weights. Preferred polymers preferably have a number average molecular weight ($M_n$) that is (i) suitable for efficient application of the coating system to a substrate (e.g., to avoid, for example, unsuitable misting or sticking) or (ii) suitable to achieve good compatibility with other materials (especially thermoplastic materials such as PVC) that may be present in the coating system. Preferred polyether polymers have an $M_n$ of at least 2,000, more preferably at least 3,000, and even more preferably at least 4,000. The molecular weight of the polyether polymer may be as high as is needed for the desired application. Typically, however, the polyether polymer $M_n$ may not exceed about 11,000. In some embodiments, the polyether polymer Mn is about 5,000 to about 8,000.

The disclosed polymer's molecular weight may be enhanced by a catalyst in the reaction of a diepoxide with one or more upgrade comonomers. Typical catalysts usable for molecular weight advancement of the epoxy material include amines, hydroxides (e.g., potassium hydroxide), phosphonium salts, and the like. A presently preferred catalyst is a phosphonium catalyst. The phosphonium catalyst is preferably present in an amount sufficient to facilitate the desired condensation reaction.

Preferred polyether polymers have at least one, and more preferably at least two functional groups capable of undergoing a chemical reaction (preferably a cross-linking reaction) with another component of the coating system.

In a presently preferred embodiment, the disclosed polymer is capable of forming a covalent linkage with a functional group of a crosslinker (and preferably a phenolic crosslinker). Examples of suitable functional groups for the polyether polymer include hydroxyl groups, carboxyl groups (including, e.g., precursor or derivative groups such as anhydride or ester groups), and combinations thereof.

As discussed above, the multi-coat coating system includes an overcoat composition. The overcoat composition may be the same polymer as described above with respect to the disclosed polyhydric phenols. In other embodiments, the overcoat composition may contain at least one thermoplastic material, which is preferably dispersed in a liquid carrier to form a thermoplastic dispersion. In still other embodiments, the overcoat composition may include polyester polymers.

Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. Polyvinyl chloride (PVC) is a particularly preferred thermoplastic material.

The thermoplastic material is typically in the form of finely divided powder or particles. Dispersion-grade thermoplastic particles are preferred, where the average particle size of the particles preferably is from about 0.1 to about 30 microns, and more preferably about 0.5 to about 5 microns. Other particle sizes, however, can be used such as, for example, non-dispersion-grade thermoplastic particles having an average particle size outside the above sizes. In some embodiments, PVC in the form of a soluble copolymer may be included in addition to dispersion grade thermoplastic materials. The UCAR™ VMCC product (available from DOW Chemical Company) is an example of a suitable solution vinyl.

Preferred PVC polymer powders exhibit no more than minimal swelling (and preferably substantially no swelling) when dispersed in a suitable liquid carrier, especially an organic solvent liquid carrier. The PVC powder employed may be of any suitable molecular weight to achieve the desired result. Preferred PVC powders have an $M_n$ of at least about 40,000, more preferably at least about 75,000, and even more preferably at least about 100,000. Preferred PVC powders exhibit an $M_n$ of less than about 300,000, preferably less than about 200,000, and even more preferably less than about 150,000. When thermoplastic polymer other than PVC are employed, the thermoplastic polymer preferably has a molecular weight within the aforementioned ranges.

Suitable commercially available PVC polymer powders for use in the present coating system include, for example, GEON™ PVC powders (e.g., GEON 171 and 178) available from Polyone Corp., Pasadena, Tex., and VINNOL™ PVC powders (e.g., VINNOL P70) available from Wacker Chemie, Munich, Germany. GEON 171 and GEON 178 PVC powders are presently preferred.

The amount of the disclose polymer included in coating compositions may vary widely depending on a variety of considerations such as, for example, the method of application, the presence of other film-forming materials, whether the coating composition is a water-based or solvent-based system, etc. For liquid-based coating compositions, however, the polymer of will typically constitute at least 1 wt-%, more typically at least 30 wt-%, and even more typically at least 50 wt-% of the coating composition, based on the total weight of resin solids in the coating composition. For such liquid-based coating compositions, the polymer will typically constitute less than about 90 wt-%, more typically less than about 80 wt-%, and even more typically less than about 70 wt-% of the coating composition, based on the total weight of resin solids in the coating composition.

Preferred undercoat or overcoat compositions include at least about 10, more preferably at least about 25, and even more preferably at least about 30 wt. % of thermoplastic material, based on the total solids weight of the respective undercoat or overcoat composition. Preferably, the undercoat or overcoat compositions, or both, include less than about 60, more preferably less than about 55, and even more preferably less than about 50 weight percent (wt. %) of thermoplastic material, based on the total solids weight of the respective undercoat or overcoat composition. While not intending to be bound by theory, in some embodiments, the incorporation of a suitable amount of thermoplastic material (and particularly PVC) into the overcoat composition is believed to be important in achieving good compatibility and adhesion between a closure compound and the overcoat composition.

As previously mentioned, the thermoplastic material is preferably dispersed in a liquid carrier to form a thermoplastic dispersion. In preferred embodiments, the thermoplastic materials are organosols or plastisols, more preferably organosols, and even more preferably vinyl organosols.

The liquid carrier of the thermoplastic dispersion is typically at least substantially non-aqueous. While not preferred, in some embodiments a relatively low amount of water may be included so long as the coating composition is not unsuitably affected. Examples of suitable liquid carriers include an organic solvent, a plasticizer, or mixtures thereof. Suitable organic solvents include, for example, aliphatic hydrocarbons including mineral spirits, kerosene, and high flash VM&P naphtha; aromatic hydrocarbons including toluene, benzene, xylene and blends thereof (e.g., Aromatic Solvent 100 from Shell); alcohols including isopropyl alcohol, n-butyl alcohol, and ethyl alcohol; ketones including cyclohexanone, ethyl aryl ketones, methyl aryl ketones, and methyl isoamyl ketone; esters including alkyl acetates (e.g., ethyl acetate and butyl acetate); glycol ethers including ethylene glycol monomethyl ether, ethylene glycol monoethyl ether, ethylene glycol monobutyl ether (e.g., glycol ether EB), and propylene glycol monomethyl ether; glycol ether esters including propylene glycol monomethyl ether acetate; aprotic solvents including tetrahydrofuran; chlorinated solvents; mixtures of these solvents and the like. Preferred liquid carriers have sufficient volatility to evaporate substantially from the coating system during the curing process.

Examples of suitable plasticizers include phosphates, adipates, sebacates, epoxidized oils (not preferred, but may be used in certain embodiments if desired), polyesters, and combinations thereof.

In some embodiments, the overcoat composition includes a polyester polymer. Suitable commercially available polyester polymers may include, for example, DUROFTAL™ VPE 6104 available from UCB and DYNAPOL™ polyester resins (e.g., DYNAPOL L 658, L 6258, LH 826 and 44826) available from Degussa, GmbH, Frankfurt, Germany. DYNAPOL L658 and DUROFTAL VPE 6104 are preferred polyesters for use in overcoat compositions. For further discussion of suitable polyester polymers, see, for example, U.S. Published Application No. 20070036903 to Mayr et al.

The undercoat composition, overcoat composition, or both, preferably includes at least one component to stabilize thermoplastic dispersions included therein. While not intending to be bound by theory, certain preferred stabilizers are believed to stabilize compositions containing dispersed thermoplastic materials such as PVC by, for example, (i) preventing degradation (e.g., through inhibiting formation of degradation products such as HCl), or (ii) scavenging degradation products such as HCl, or both.

Examples of suitable stabilizers include organotin esters such as dibutyl tin dilaurate; organotin maleates, especially dibutyl tin maleate; mono- and di-octyl tin mercaptides (e.g., TINSTAB™ OTS 17 MS available from AKZO Nobel Chemicals, Inc., Chicago, Ill.); barium, cadmium, and strontium metal soaps; calcium ion exchanged amorphous silica gel; calcium borosilicate; calcium phosphosilicate; strontium zinc phosphosilicate; magnesium zirconium salt; zinc aluminum polyphosphate hydrate; zinc aluminum strontium orthophosphate; polyphosphate silicate hydrate; hydrotalcite (e.g., the HYCITE™ 713 product available from Ciba Specialty Chemicals, Inc., Basel, Switzerland); hydrated zinc and aluminum polyphosphate; zinc aluminum polyphosphate; zinc phosphate; organic di-acid; zinc molybadate compound; zinc phospho molybadate; calcium zinc molybdate; calcium molybadate propylene oxide; oxirane-functional stabilizers such as epoxidized oils (e.g., epoxidized linseed oil, epoxidized soybean oil, and the like.), adducts of dimer acids of diglycidyl ether (DGE), epoxidized polybutadienes, epoxy-functionalized stabilizers including a monomeric unit derived from a glycidyl ester of an α,β-unsaturated acid or anhydride thereof (see U.S. Pat. No. 6,916,874), and any of the oxirane-functional stabilizers taught in U.S. Pat. No. 6,924,328; (meth)acrylic (co)polymers; polyester polymers such as, for example, acrylated polyesters, fatty-acid modified polyesters, acrylated fatty-acid-modified polyesters (see U.S. Published Application No. 2010/0056721 entitled "Stabilizer Polymer and Coating Compositions Thereof" by Payot et. al. filed on Apr. 2, 2007); phenolic-functional polyester polymers (see U.S. 2011/031559); polyester-carbamate polyesters (See U.S. Published Application No. 2012/0125800) and mixtures, copolymers, or derivatives thereof.

In some embodiments, the stabilizer is as disclosed in U.S. Provisional Application No. 61/681,602 titled "Stabilizer Compositions" filed Aug. 9, 2012.

The undercoat composition, overcoat composition or both may be formulated using one or more curing agents, including, for example, one or more crosslinkers. The choice of a particular crosslinker typically depends on the particular product being formulated. For example, some coating compositions are highly colored (e.g., gold-colored coatings). These coatings may typically be formulated using crosslinkers that tend to have a yellowish color. In contrast, white coatings are generally formulated using non-yellowing crosslinkers, or only a small amount of a yellowing crosslinker. Any suitable crosslinker can be used. For example, phenolic crosslinkers (e.g., phenoplasts), amino crosslinkers (e.g., aminoplasts), anhydride- or carboxylic-acid-group-containing crosslinkers or both, isocyanate-group containing crosslinkers, and combinations thereof, may be employed. Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, and combinations thereof. Examples of suitable commercially available phenolic compounds include BAKELITE™ phenolic compounds (e.g., BAKELITE 6535LB, 6581LB, and 6812LB) available from Bakelite A. G., Iserlohn, Germany, DUREZ™ phenolic compounds (e.g., DUREZ 33162) available from Durez Corporation, Addison, Tex., PHENODUR™ phenolic compounds (e.g., PHENODUR PR 285 55/IB/B and PR 897) available from CYTEC Surface Specialties, Smyrna, Ga., and SANTOLINK™ phenolic compounds (e.g., SANTOLINK EP 560) available from CYTEC Surface Specialties and mixtures thereof. Phenolic crosslinkers are presently preferred crosslinkers, with BPA-free resole phenolic crosslinkers being particularly preferred. In presently preferred embodiments, the undercoat composition contains at least one phenolic crosslinker.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, and urea-formaldehyde-based resins and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL™ 301, CYMEL 303, CYMEL 370, CYMEL 373, CYMEL 1131, CYMEL 1125, and CYMEL 5010 Maprenal MF 980 all available from Cytec Industries Inc., West Patterson, N.J.; and URAMEX™ BF 892 available from DSM, Netherlands and mixtures thereof. Examples of suitable isocyanate crosslinking agents include blocked or non-blocked aliphatic, cycloaliphatic or aromatic di-, tri-, or poly-valent isocyanates, such as hexamethylene diisocyanate, cyclohexyl-1,4-diisocyanate, mixtures thereof, and the like.

The crosslinker concentration may vary depending upon the desired result. For certain embodiments, the undercoat composition preferably includes a greater total amount of crosslinker than the overcoat composition. While not intending to be bound by theory, it is believed that the presence of an excessive amount of crosslinker in the overcoat composition can unsuitably degrade adhesion between the cured coating system and, for example, a closure compound.

Preferred undercoat compositions contain at least about 0.01, more preferably at least about 1, and more preferably at least about 5 wt. % of crosslinker, by solid weight of the undercoat composition. Preferably, the undercoat compositions contain less than about 30, more preferably less than about 25, and even more preferably less than about 20 wt. % of crosslinker, by solid weight of the undercoat composition. In a presently preferred embodiment, the undercoat composition includes about 12 wt. % of crosslinker by solid weight of the composition.

Preferred overcoat compositions contain at least about 0.01, more preferably at least about 1, and more preferably at least about 3 wt. % of crosslinker, by solid weight of the overcoat composition. Preferably, the overcoat compositions contain less than about 25, more preferably less than about 20, and even more preferably less than about 15 wt. % of crosslinker, by solid weight of the overcoat composition. In a presently preferred embodiment, the undercoat composition includes about 6 wt. % of crosslinker by solid weight of the composition.

The multi-coat coating system may optionally include other additives that do not adversely affect the coating system or a cured coating system resulting therefrom. The optional additives are preferably at least substantially free of BPA, BPF, BPS, or any diepoxides thereof (e.g., diglycidyl ethers thereof such as BADGE). Suitable additives include, for example, those that improve the processability or manufacturability of the composition, enhance composition aesthetics, or improve a particular functional property or characteristic of the coating composition or the cured composition resulting therefrom, such as adhesion to a substrate, or both. Additives may include carriers, catalysts, emulsifiers, pigments, metal powders or paste, fillers, anti-migration aids, anti-microbials, extenders, curing agents, lubricants, coalescents, wetting agents, biocides, plasticizers, antifoaming agents, colorants, waxes, anti-oxidants, anticorrosion agents, flow control agents, thixotropic agents, dispersants, adhesion promoters, scavenger agents, or combinations thereof. Each optional ingredient may be included in a sufficient amount to serve its intended purpose, but preferably not in such an amount to adversely affect a coating composition or a cured coating composition resulting therefrom.

The film thickness of multi-coat coating systems may vary depending upon a variety of factors, including, for example, the desired properties (e.g., mechanical properties, aesthetic properties, corrosion resistance, and the like) of the cured coating system, the substrate upon which the coating system is applied, the presence of substances that may contact the cured coating system (e.g., certain aggressive or corrosive products), or the intended use of the coated article. In presently preferred embodiments, the total dry film weight of the cured coating system is at least about 5, more preferably at least about 10, and even more preferably at least about 15 g/m$^2$ (grams per square meter). Preferably, the total dry film weight of the cured coating system is less than about 40, more preferably less than about 30, and even more preferably less than about 25 g/m$^2$.

In presently preferred embodiments, the coating system is a two-coat coating system that includes a base layer formed from the undercoat composition and a topcoat formed from the overcoat composition. In some embodiments, however, the coating system may include one or more intermediate layers between the undercoat composition and the overcoat composition. Likewise, in some embodiments, the coating system may include one or more topcoats overlying the overcoat composition.

Thermoplastic dispersions can be prepared using any suitable method to preferably provide sufficient suspension and dispersion of the particles included therein. Examples of suitable process methods include solution blending, high-speed dispersion, high-speed milling, and the like. A substantially homogeneous dispersion of the particles throughout the liquid carrier typically indicates an adequate mixture or blend. The thermoplastic particles preferably remain substantially undissolved in the liquid carrier.

To prepare the multi-coat coating systems, in some embodiments, a thermoplastic dispersion is made in a first step (a dispersion phase) where the composition is thickened and has somewhat higher solids than the subsequent phase, often referred to as the "let down," where the components (e.g., addition of the stabilizer polymer) are stirred at a slower rate. Examples of suitable process methods to make the coating compositions include admixture, blending, paddle stirring, and the like.

Cured coating systems preferably adhere well to metal (e.g., steel, tin-free steel (TFS), tin plate, electrolytic tin plate (ETP), aluminum, black plate, and the like) and preferably provide high levels of resistance to corrosion or degradation that may be caused by prolonged exposure to, for example, food or beverage products. The coatings may be applied to any suitable surface, including inside surfaces of containers, outside surfaces of containers, container ends, and combinations thereof.

Cured coating systems of the present invention are particularly well suited as adherent coatings for metal cans or containers, although many other types of articles can be coated. Examples of such articles include closures (including, e.g., food-contact surfaces of twist off closure lids or easy-open-end for food and beverage containers); bottle crowns; two and three-piece cans (including, e.g., food and beverage containers); shallow drawn cans; deep drawn cans (including, e.g., multi-stage draw and redraw food cans); can ends; drums (including general packaging drums and drums for packaging food or beverage products); monobloc aerosol containers; and general industrial containers, cans (e.g., paint cans), and can ends.

Preferably, the cured systems are retortable when employed in food and beverage container applications. Preferred cured coatings can withstand elevated temperature conditions frequently associated with retort processes or other food or beverage preservation or sterilization processes. Particularly preferred cured coating systems exhibit enhanced resistance to such conditions while in contact with food or beverage products that exhibit one or more aggressive (or corrosive) chemical properties under such conditions.

The multi-coat coating system can be applied to a substrate using any suitable procedure such as, for example, spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The multi-coat coating system can be applied to a substrate prior to, or after, forming the substrate into an article. For closures, the substrate is typically coated prior to forming the substrate into an article (although, if desired, the substrate can be coated after forming the substrate into a closure). Preferably, at least a portion of the substrate is coated with the multi-coat coating system, which is then at least partially cured before the substrate is formed into an article. In presently preferred embodiments, the following method is employed: (1) the undercoat composition is applied to at least a portion of the substrate, (2) the undercoat composition is then cured, (3) the overcoat composition is applied to the cured undercoat composition, and (4) the overcoat composition is then cured to produce a cured coating system. Alternatively, the method may include (a) applying the undercoat composition to at least a portion of the substrate, (b) drying the undercoat composition (which may result in at least partial crosslinking), (c) applying the overcoat composition to the undercoat composition (or to one or more optional intermediate layers applied to the undercoat composition), and (d) curing the coating system to produce a cured coating system.

In some embodiments, multiple layers of the overcoat or undercoat or both composition may be applied.

The multi-coat coating system is preferably cured to form a hardened coating system. After applying the coating system onto a substrate, the coating compositions can be cured using a variety of processes, including, for example, oven baking by either conventional or convectional methods, or any other method that provides an elevated temperature that preferably allows the thermoplastic material particles to fuse together. The curing process may be performed in either discrete or combined steps. For example, substrates can be dried at ambient temperature to leave the coating compositions in a largely un-crosslinked state. The coated substrates can then be heated to fully cure the compositions. In certain instances, coating compositions can be dried and cured in one step.

The curing process may be performed at temperatures in the range of about 177° C. to about 260° C., taking into account, however that the upper end of the temperature range can change depending on the decomposition temperature of the thermoplastic material. PVC, for example, typically begins to degrade at about 188° C., while other materials may degrade at higher or lower temperatures. In the situations where PVC is used and the substrate coated is in metal sheet form, curing is preferably performed at about 177° C. to about 260° C. for a suitable oven residence time (e.g. at about 5 to about 15 minutes). Where the coating compositions are applied on metal coils, curing is typically conducted at temperatures of about 210° C. to about 232° C. for a suitable oven residence time (e.g. at about 15 to about 30 seconds).

The following test methods may be utilized to assess the performance properties of cured coating systems of the invention.

I. Corrosion Resistance Test

A test useful for assessing the corrosion resistance of a cured coating system is provided below. The test (referred to herein as the "Corrosion Resistance Test") may be useful for simulating the ability of a cured coating system to withstand prolonged exposure to products such as, for example, food or beverage products having one or more corrosive properties.

ETP sheet substrate is coated with a sufficient amount of coating composition such that, when the coating composition is cured, a cured coating having a dry film weight of about 15 g/m$^2$ is produced. The curing conditions may vary depending upon the coating system, but, for example, for purposes of evaluating multilayer coating compositions, the following conditions may be used: (1) an amount of undercoat composition sufficient to yield a dry film weight of 10 g/m$^2$ is applied to the ETP and the coated ETP is cured in an oven for about 10 minutes until a peak metal temperature (PMT) of about 190° C. is obtained and then (2) an amount of overcoat composition sufficient to yield a dry film weight of 5 g/m$^2$ is applied to the undercoat composition and the coated ETP is again cured in an oven for about 10 minutes until a PMT of about 190° C. is obtained. Within 1 day of coating the ETP substrate, the coated ETP substrate is fabricated into a diameter 62 industrial cap, whereby the coating is located on the interior surface of the cap. The profile of the diameter 62 cap is preferably relatively gentle (e.g., the cap does not have a severe contour profile). Within 1 day of forming the cap, 0.5 milliliters ("ml") of a conventional liquid plastisol closure compound (e.g., a type of closure compound typically used to seal closures to glass jars) is applied to a portion of the coating where a closure compound is typically applied for closure applications. The cap is rotated quickly so that the closure compound is applied about one-third of the way around the circumference of the cap, thereby covering about one-third of the area that a closure compound would typically cover.

Within 1 day of application, the closure compound is cured at a temperature and time typically employed for the type of closure compound employed. For example, for some closure compounds appropriate curing conditions may include placing the cap in a 200° C. oven for 2 minutes. For other closure compounds, a temperature of 210° C. or 220° C. may be more appropriate for a longer or shorter duration than 2 minutes. A 200 ml glass jar with a threaded opening compatible with a diameter 62 cap is filled with 180 ml of a simulant solution that includes 4.5 w/w % NaCl and 4.5 w/w % acetic acid (the balance being distilled water). The cap is threaded onto the filled jar and screwed tight by hand. The filled jar is placed upright in a 40° C. oven for a specified test period (e.g., 1 week, 2 weeks, 3 weeks, 4 weeks, etc.). After expiration of the test period, the interior surface of the cap is visually examined for defects, without the use of magnification. For a cured coating to pass the Corrosion Resistance Test, (i) no blistering should be present on the coated interior flat surface of the cap and (ii) the closure compound should not exhibit any corrosion color (as evidenced, for example, by the appearance of rust).

Preferred multi-coat coating systems preferably pass the Corrosion Resistance Test after being exposed to the simulant solution for a test period of 1 week, 2 weeks, 3 weeks, and 4 or more weeks.

II. Adhesion Test

A useful test for assessing whether coating compositions adhere well to a substrate is ASTM D 3359—Test Method B, performed using SCOTCH 610 tape, available from 3M Company of Saint Paul, Minn. (referred to herein as the "Adhesion Test"). Adhesion is generally rated on a scale of 0-10 where a rating of "10" indicates no adhesion failure, a rating of "9" indicates 90% of the coating remains adhered, a rating of "8" indicates 80% of the coating remains adhered, and so on. Preferred cured coating systems (before retort) preferably exhibit an adhesion on the above scale of at least about 8, more preferably at least about 9, and even more preferably 10.

To assess the ability of cured coating systems to exhibit good adhesion after being subjected to sterilization or retort processes frequently employed in the packaging of food or beverage products, the below "retort" method may be useful: ETP sheet substrate, having a coating to be tested is cured thereon and is partially immersed in a vessel filled with water. The vessel is placed in an autoclave or retort kettle and for 1 hour is subjected to a temperature of about 130° C. and a pressure of about 1.7 Bar in the presence of steam. After being retorted under these conditions, preferred cured coating systems when subjected to the Adhesion Test, preferably exhibit an adhesion of at least about 8, more preferably at least about 9, and even more preferably 10.

The following examples are offered to aid in understanding of the present invention and are not to be construed as limiting the scope thereof. Unless otherwise indicated, all parts and percentages are by weight.

EXAMPLES

Example 1: Diepoxides of Ortho-Substituted Polyhydric Phenols

Run I: Diglycidyl ether of 4,4'-methylenebis(2,6-di-tert-butylphenol)

A solution of 4,4'-methylenebis(2,6-di-t-butylphenol) (500 grams, 1.076 moles obtained from Albemarle Corporation) in anhydrous dimethylformamide (1.5 liters) was cooled to −10° C. and a solution of sodium tert-pentoxide (374 grams, 3.23 moles) in anhydrous dimethylformamide (1.5 liters) was added dropwise at −10 to −5° C. The mixture was stirred for 30 minutes at −10° C. Epichlorohydrin (1.9 liters, 24.2 moles) was added via dropping funnel at −10 to −5° C. The solution was allowed to warm up to room temperature and then was heated for 16 hours at a temperature of from 75 to 82° C. After cooling down to ambient temperature, the mixture was added to cold tap water (12 liters). Ethyl acetate (5 liters) was added to the mixture, which was stirred for 10 minutes and separated. The aqueous layer was extracted again with additional ethyl acetate (3 liters). The combined ethyl acetate extracts were washed twice with brine (2×6 liters), dried over anhydrous sodium sulfate (600 grams), and filtered. The solvent was removed under reduced pressure to give 887 grams of crude product as a purple oil. The crude product was dissolved in toluene (600 milliliters) and passed over a silica gel pad (1.4 kilograms), and eluted with a mixture of toluene and heptane (8 parts toluene to 2 parts heptane). The fractions containing product were combined and evaporated under reduced pressure. The product was mostly the desired diepoxide (756 grams, yellow oil which crystallizes in time), with some monoepoxide present. The purified material (756 grams) was dissolved at 70° C. in 2-propanol (2.3 liters) and then allowed to cool down to room temperature overnight. The flask was kept in an ice-water bath for 3 hours, filtered and the solids were washed three times with cold 2-propanol (3×400 milliliters). The obtained solid was dried under high vacuum at ambient temperature to give the final product as a white solid (371 grams having an HPLC purity of 95.2%, and a yield of 60%). The epoxy value of the final product was 0.367 equivalents per 100 grams. The resulting diglycidyl ether of 4,4'-methylenebis(2,6-di-t-butylphenol) was tested using suitable genotoxicity assays (e.g., Ames II assay) and was found to be non-genotoxic.

Run II: Diglycidyl ether of 4,4'Butylidenebis(2-t-butyl-5-methylphenol))

A 20-gram batch of the diglycidyl ether of 4,4'-butylidenebis(2-t-butyl-5-methylphenol) was prepared by reacting epichlorohydrin with 4,4'-butylidenebis(2-t-butyl-5-methylphenol). Multiple purification steps were required to obtain a suitably pure batch. The purified batch exhibited an epoxy value of 0.402 equivalents per 100 grams. The resulting diglycidyl ether of 4,4'-butylidenebis(2-t-butyl-5-methylphenol) was tested using suitable genotoxicity assays (e.g., Ames II assay) and was found to be non-genotoxic.

Run III: Diglycidyl ether of 4,4'-methylenebis(2,6-dimethylphenol)

4,4'-Methylenebis(2,6-dimethylphenol) (32 grams, 0.125 moles), epichlorohydrin (140 milliliters, 1.79 moles), and 2-propanol (150 milliliters) were heated to 80° C. in an oil bath. Sodium hydroxide (12.5 grams, 0.313 moles) in water (20 milliliters) was added in portions over 5 minutes. The purple solution was heated for 2 hours at 80° C. The mixture was cooled to room temperature, filtered, and concentrated on a rotary evaporator at a temperature of about 30-40° C. The remaining oil was mixed with dichloromethane (50 milliliters) and heptane (100 milliliters) and allowed to stir for 30 minutes at ambient temperature. The salts were removed by filtration and the filtrate was concentrated on a rotary evaporator at 30-40° C. The remaining oil was dried under high vacuum at ambient temperature until a constant weight was obtained. The crude product was crystallized twice from methanol (250 milliliters) and dried under high vacuum at ambient temperature until a constant weight was obtained. The experiment generated diglycidyl ether of 4,4'-methylenebis(2,6-dimethylphenol) (28 grams, 60% yield) as a white solid. The epoxy value was 0.543 equivalents per 100 grams.

The polyhydric phenols used to make the diglycidyl ethers of each of Runs I-III were assayed and found to be non estrogenic.

Example 2: Polyhydric Phenol Adducts

Run I: Polyhydric Phenol Adduct of 1 Mole 4,8-Bis(hydroxymethyl)tricyclo[5.2.1.0]decane with 2 moles of 3-hydroxy Benzoic Acid To a 4-neck round-bottom flask equipped with a mechanical stirrer, a water-cooled condenser on top of a Dean-Stark Trap, and a thermocouple connected to heating control device and a heating mantle was added 249.24 parts of tricyclodecane dimethanol or "TCDM" (from OXEA), 350.76 parts of 3-hydroxybenzoic acid (from Aldrich), and 0.6 parts of a polymerization catalyst. Stirring and heating was begun over 4 hours until the batch reached 230° C. The batch was heated at 230° C. for 4 more hours, at which time about 43 parts of water was collected and the acid value was 2.0 mg KOH/gram. At that time, heating was discontinued until the batch reached 120° C., at which time the batch was discharged. The material was a solid at room temperature that could be broken up.

Run II: Polyhydric Phenol Adduct of 1 Mole 4,8-Bis(hydroxymethyl)tricyclo[5.2.1.0]Decane with 2 Moles of 4-hydroxy Phenylacetic Acid To a 4-neck round-bottom flask equipped with a mechanical stirrer, a water-cooled condenser on top of a Dean-Stark Trap, and a thermocouple connected to heating control device and a heating mantle was added 235.3 parts of TCDM (from OXEA), 364.7 parts of 4-hydroxy phenyl acid (from Aceto), and 0.65 parts of polymerization catalyst. Stirring and heating was begun over 7 hours until the batch reached 230° C. The batch was heated at 230° C. for 8 more hours, at which time a total of 40 parts of water were collected and the acid value was 1.8 milligrams KOH/gram. At that time, heating was discontinued until the batch reached 120° C., at which time the batch was discharged. The material was a tacky semi-solid at room temperature.

Run III: Polyhydric Phenol Adduct of 1 Mole 1,4-Cyclohexanedimethanol (CHDM) with 2 moles of 3-hydroxy Benzoic Acid To a 4-neck round-bottom flask equipped with a mechanical stirrer, a water-cooled condenser on top of a Dean-Stark Trap, and a thermocouple connected to heating control device and a heating mantle was added 228.6 parts of the CHDM-90 product (90% cyclohexane dimethanol in water from Eastman), 394.2 parts of 3-hydroxybenzoic acid (from Aceto), and 0.6 parts polymerization catalyst. Stirring and heating was begun over 4 hours until the batch reached 230° C. The batch was heated at 230° C. for 8 more hours, at which time 70 parts of water were collected and the acid value was 1.6 milligrams KOH/gram. At that time, heating was discontinued until the batch reached 120° C., at which time the batch was discharged. The material was a solid at room temperature that could be broken up.

Run IV: Polyhydric Phenol Adduct of 1 Mole 1,4-Cyclohexanedimethanol (CHDM) with 2 Moles of 4-hydroxy Phenylacetic Acid To a 4-neck round-bottom flask equipped with a mechanical stirrer, a water-cooled condenser on top of a Dean-Stark Trap, and a thermocouple connected to heating control device and a heating mantle was added 214.3 parts of the CHDM-90 product, 407.1 parts of 4-hydroxy phenylacetic acid (from Aceto), and 0.6 parts polymerization catalyst. Stirring and heating was begun over 4 hours until the batch reached 230° C. The batch was heated at 230° C. for 6 more hours, at which time 65 parts of water were collected and the acid value was 3.0 milligrams KOH/gram. At this time, heating was discontinued until the batch reached 120° C., at which time the batch was discharged. The material was a solid at room temperature that could be broken up.

Run V: Reaction between 2 moles of 3-hydroxybenzoic Acid with 1 Mole 1,4-cyclohexane Dimethanol To a 4-neck round-bottom flask equipped with a mechanical stirrer, a water cooled condenser on top of a Dean-Stark Trap filled with xylene, and a thermocouple connected to heating control device and a heating mantle was added 480.7 parts of CHDM-90 (90% cyclohexane dimethanol in water from Eastman), 828.7 parts of 3-hydroxybenzoic acid (from Aceto), 360 parts xylene and 5.71 parts p-toluenesulfonic acid. Stirring and heating was carried out over 2 hours until the batch reached 145° C. and the xylene was refluxing. The batch was heated at 145° C. for 10 more hours, at which time 162 parts of water were collected. At that time, heating was increased until the batch reached 168° C., at which time the 220 ml of xylene was collected, and the batch was discharged. The material was a solid at room temperature that could be broken up and dried to >99% solids overnight in a vacuum oven at 115° C.

Example 3

Synthesis of Diglycidyl Ether of Tetramethyl Bisphenol F (TMBPF)/Hydroquinone Polymer To a 4-neck round-bottom flask equipped with a mechanical stirrer, a nitrogen inlet to maintain a nitrogen blanket, a water-cooled condenser, and a thermocouple connected to heating control device and a heating mantle was added 833.3 parts of TMBPF DGE (Example 1. Run III) (at 94.8% solids in xylene-790 parts neat. Epoxy value=0.527 eq/100 grams), 210 parts of hydroquinone, 1 part catalyst 1201, and 20.4 parts ethyl CARBITOL™ (from Dow Chemical Co.). This mixture was heated with stirring to 125° C., allowed to exotherm to 172° C., then heated at 160° C. for 3 hours until the epoxy value was 0.038 eq/100 g. At this point 936.3 parts cyclohexanone were added to the mixture while cooling the mixture to 70° C. The batch was discharged affording a solvent based polymer with a nonvolatile content=50.6%, Epoxy value=0.034 eq/100 grams, and viscosity=16,300 centipoise.

Example 4

Synthesis of Tetramethylbisphenol F Diglycidyl Ether(TMBPF DGE)/Cyclohexane Dimethanol-3-Hydroxybenzoic Acid (CHDM-3-HBA) Polymer To a 4-neck round-bottom flask equipped with a mechanical stirrer, a nitrogen inlet to maintain a nitrogen blanket, a water-cooled condenser, and a thermocouple connected to heating control device and a heating mantle was added 460.8 parts of TMBPF DGE (Example 1, Run III) (at 94.8% solids in xylene-790 parts neat), 387.1 parts of CHDM/3-HBA (Example 2, Run V), 2.47 parts catalyst 1201, and 19.4 parts methyl isobutyl ketone. This mixture was heated with stirring to 125° C., allowed to exotherm to 143° C., then heated at 160° C. for 2 hours until the epoxy value was 0.038 eq/100 g. At this point 780.6 parts cyclohexanone were added to the mixture while cooling the mixture to 70° C. The batch was discharged affording a solvent based polymer with a nonvolatile content=50.8%, Epoxy value=0.034 eq/100 grams, and viscosity=8000 centipoise.

Example 5

Formulation of Coating Containing Polymer from Example 3

The following components were mixed for approximately 10 minutes: 9.49 parts of the resin from example 3, 1.72 parts of a 65% solids phenolic, 0.72 parts of a 77% solids phenolic, 8.17 parts of cyclohexanone, and 0.32 parts of 10% phosphoric acid in butanol.

Example 6

Formulation of Coating Containing Polymer from Example 4

The following components were mixed for approximately 10 minutes: 9.45 parts of the resin from example 4, 2.46 parts of a 65% solids phenolic, 8.09 parts of cyclohexanone, and 0.32 parts of 10% phosphoric acid in butanol.

Examples 7-8

Closure Testing of Coating Compositions

In Example 7, the formulations of Example 5 was used and in Example 8, the formulation of Example 6 was used. The coatings for Examples 7 and 8 were each drawn down with a wire bar on electro-plated tin plate and baked 12 minutes at 204° C. (400° F.) to achieve a film thickness of 6.2 grams/square meter (4 milligrams/sq. inch). Then a standard topcoat (e.g., PVC organosol, thermosetting phenolic resin, and epoxy novolac stabilizer) for closures was applied at 12.4 grams/square meter (8 milligrams/sq./inch) and cured for 12 minutes at 190° C. (375° F.). From this metal, a 63 mm lugcap closure was fabricated. Standard plastisol (containing a mixture of polyvinylidene chloride, lubricant, and stabilizers) were applied in the channel of the closure on top of the two coat system and cured 1.5 minutes at 204° C. (400° F.). These closures were then sealed on glass jars containing 5% acetic acid for 2 months at 37° C. (100° F.). The corrosion on the inside of the closure was evaluated. The results are shown in Table 3.

| Corrosion Test | Example 7 | Example 8 | Comparative Example |
|---|---|---|---|
| Panel | 0 | 0 | 0 |
| Around Plastisol | 3 | 4 | 3 |

Example 7 had better corrosion resistance than the BADGE/BPA based standard in the industry. Example 8 had similar corrosion resistance to the BADGE/BPA based standard in the industry.

Examples 9-10

Preparation of Polyether Coating Composition

Ingredients for the undercoat composition are provided in Table 4. To prepare the coating composition, the resin compositions of Examples 3 and 4 may be charged to a mixing vessel and the phenolic resin may be stirred until blended. In a separate container, isoproponal and phosphoric acid may be pre-mixed and then added to the mixing vessel with additional mixing. Eastman™ EB solvent may then added to the mixing vessel and the under-coat composition was mixed until substantially homogenous.

TABLE 4

| Raw Material | Example 9 | Example 10 |
|---|---|---|
| Polyether From Example 3 | 69.77 | |
| Polyether From Example 4 | | 69.77 |
| Phenol Phenolic | 9.54 | 9.54 |
| Isopropanol | 1.85 | 1.85 |
| Catalyst | 0.25 | 0.25 |
| Eastman ™ EB | 18.59 | 18.59 |
| | 100.0 | 100.0 |

Example 11

Preparation of Organosol Overcoat (Topcoat) Coating Composition

The organosol topcoat may be a polyvinyl chloride organosol, a phenolic resin and an epoxidized soybean oil (ESBO) PVC stabilizer.

Examples 12-13

Coating of Substrate with a Two-Coat System

An undercoat coating composition may be prepared by using the coating composition described in Example 9 or Example 10. For Example 9 and Example 10 coating compositions may each be first applied to 0.22 millimeter (mm) gauge electrolytic tin plate (ETP) using a bar coater. The coated substrate samples may be then cured in an oven for 10 minutes at 182° C. (360° F.) peak metal temperatures (PMT) in a gas-fired oven. The targeted dry film weight of the cured base coating may be about 6-7 g/m$^2$.

An overcoat coating composition as described in Example 11 may then be applied to the cured undercoat coatings using a bar coater. The resulting coated substrate samples may then be cured in an oven for 10 minutes at 204° C. (400° F.) PMT in a gas-fired oven. The targeted dry film weight of the cured top coatings formed by the composition of Example 11 may be about 6-7 g/m$^2$.

The cured coated sheets from Examples 12 and 13 may be evaluated for flexibility by stamping easy open food can ends and by drawing 202×200 food cans.

Example 14

(Comparative) Coated Substrate

Examples 12 and 13 may be compared to a commercial two-coat epoxy-based "gold lacquer" composition using an under-coat primer containing a combination of an epoxy resin and a phenolic resin and a top-coat lacquer containing a combination of a PVC organosol, a phenolic resin and an epoxidized soybean oil (ESBO) PVC stabilizer (available from the Valspar Corp., Pittsburgh, Pa.). This control gold lacquer composition may be applied to electrolytic tin plate (ETP) scrolled sheets at approximately 16-20 g/m$^2$.

The results may show that the disclosed multi-coat compositions applied on the metal substrates may have similar or improved adhesion, flexibility, corrosion resistance and other coating characteristics but with reduced or no estrogenic activity from the polymers derived from the disclosed polyhydric phenol compounds.

Example 15

Synthesis of the Diglycidyl Ether of 2,5-di-t-butyl Hydroquinone and a Polyether Polymer Therefrom 2,5-di-tert-butylhydroquinone (30 g, 0.135 mol) was dissolved in 2-propanol (500 mL) and epichlorohydrin (100 g, 1.08 mol) at room temperature. Sodium hydroxide (16.2 g, 0.405 mol) in water (63 mL) was added in portions over 5-10 minutes. After stirring for 30 minutes the purple solution was heated to 70° C. The mixture was stirred overnight at 70° C. After 20 hours, the solution was cooled to room temperature and filtered. The 2-propanol was removed on a rotary evaporator at 30° C. The remaining mixture was diluted with water (400 mL) and extracted with ethyl acetate (1 L). The organic extract was dried over sodium sulfate. After filtration and concentration under reduced pressure, the remaining oil was dried under high vacuum at ambient temperature until a constant weight was obtained. The crude product (48.4 g, orange solid) was stirred with hot methanol (200 mL) for 30 minutes. The methanol was allowed to cool to room temperature, while stirring. The solid product was filtered and suspended again in hot methanol (150 mL). After cooling and filtering, the semi-purified product (30.1 g, 90-95% purity by NMR) was crystallized from hot ethyl acetate (50 mL). The ethyl acetate was cooled to room temperature and then refrigerated for 4 hours at −10° C. The crystallized product was filtered and dried under high vacuum at ambient temperature until a constant weight was obtained. The experiment generated the diglycidyl ether of 2,5-di-tert-butylhydroquinone (19.4 g, 43% yield) as a white solid. The epoxy value was 0.577 equivalents per 100 grams of material.

To a 4-neck round-bottom flask equipped with a mechanical stirrer, a nitrogen inlet to maintain a nitrogen blanket, a water-cooled condenser, and a thermocouple connected to heating control device and a heating mantle was added 15.34 parts of the diglycidyl ether of 2,5-di-tert-butyl hydroquinone, 4.54 parts of hydroquinone, 0.018 part CATALYST 1201, and 1.05 parts ethyl carbitol. This mixture was heated with stirring to 125° C., allowed to exotherm to 169° C., then heated at 160° C. for 3 hours until the epoxy value was 0.034 equivalents per 100 grams. At this point to the mixture was added 18.8 parts cyclohexanone, while the mixture was cooled to 70° C. The batch was discharged affording a solvent-based polymer with a nonvolatile content ("NVC") of 50% and an epoxy value of 0.034 equivalents per 100 grams of polymer. The polymer had an Mn of 6,520, a PDI of 2.47, and exhibited a Tg of 74° C.

The bisphenol free epoxy resin may be used to make coating compositions, for example by using the resin in place of the polyethers employed in Examples 9-10.

All patents, patent applications and literature cited in the specification are hereby incorporated by reference in their entirety. In the case of any inconsistencies, the present disclosure, including any definitions therein will prevail.

What is claimed is:

1. A multi-coat coating system comprising:
   an undercoat composition comprising:
   a polymer having two or more aryl or heteroaryl groups joined by a linking group having a molecular weight of about 125 Daltons to about 500 Daltons; and
   an overcoat composition comprising at least one thermoplastic material or a polyester polymer,
   wherein the polymer is derived from polyhydric phenols having a logarithmic Relative Proliferative Effect (RPE) of −2 or less.

2. The multi-coat coating system according to claim 1, wherein the polymer of the undercoat composition has one or more segments of the below Formula IA:

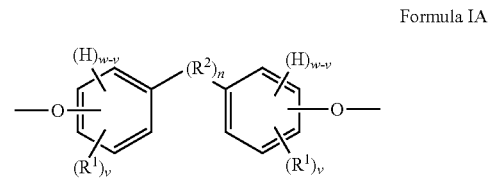

Formula IA wherein:
   i. H denotes a hydrogen atom, if present;
   ii. each $R^1$ is independently an atom or group having an atomic weight of at least 15 Daltons;
   iii. v is independently 0 to 4;
   iv. w is 4;
   v. n is 1;
   vi. $R^2$ is the linking group having a molecular weight of about 125 Daltons to about 500 Daltons; and
   vii. two or more $R^1$ or $R^2$ groups can join to form one or more cyclic groups.

3. The multi-coat coating system according to claim 2, wherein $R^2$ has a molecular weight of at least 150 Daltons.

4. The multi-coat coating system according to claim 2, wherein $R^2$ is a polar linking group.

5. The multi-coat coating system according to claim 4, wherein $R^2$ includes one or more ketone, carboxyl, carbonate, hydroxyl, phosphate, or sulfoxide groups.

6. The multi-coat coating system according to claim 2, wherein $R^2$ is a polar linking group and includes at least one aryl or heteroaryl group.

7. The multi-coat coating system according to claim 2, wherein $R^2$ is a polar linking group and includes at least one cyclic group.

8. The multi-coat coating system according to claim 2, wherein for at least one of the phenylene rings depicted in Formula IA, v is 1 to 4.

9. The multi-coat coating system according to claim 2, wherein for at least one of the phenylene rings depicted in Formula IA, v is 1 to 4 and at least one $R^1$ is attached to the ring at an ortho or meta position relative to the oxygen atom depicted in Formula IA.

10. The multi-coat coating system according to claim 2, wherein the segments of Formula IA are derived from at least one of the diglycidyl ether of 2,2-bis(4-hydroxyphenyl) propanoic acid, the diglycidyl ether of 4,4',4''-(ethane-1,1,1-triyl)triphenol, or the diglycidyl ether of 4,4'-(1,4-phenylenebis(propane-2,2-diyl))polyhydric phenol.

11. The multi-coat coating system according to claim 2, wherein the segments of Formula IA are derived from one or more of:

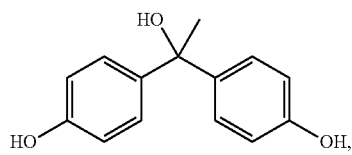

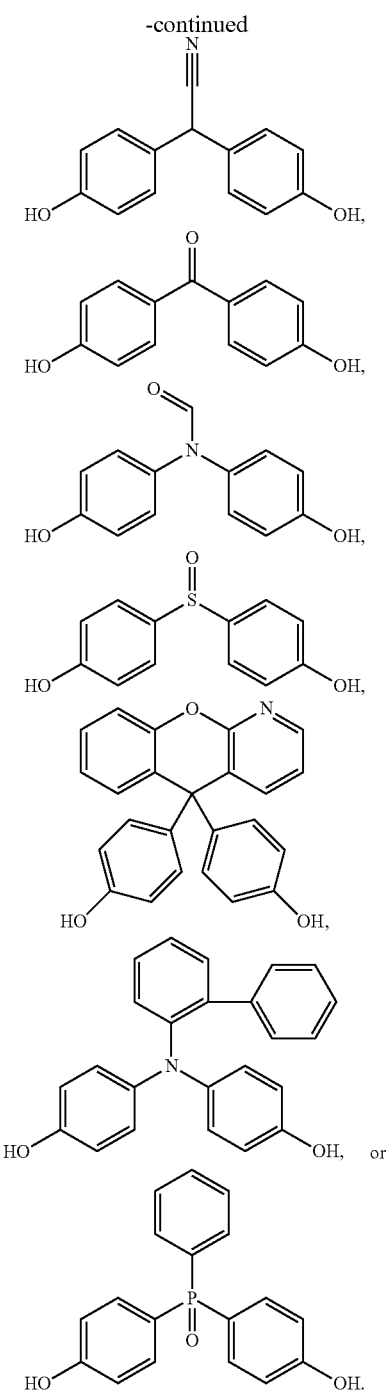

12. The multi-coat coating system according to claim 1, wherein the undercoat composition comprises a non-aqueous liquid carrier.

13. The multi-coat coating system according to claim 1, wherein the multi-coat coating system is substantially free of polyhydric phenols that exhibit an RPE logarithmic value of greater than about −3.0.

14. The multi-coat coating system according to claim 1, wherein the multi-coat coating system is substantially free of polyhydric phenols having estrogenic activity greater than or equal to that of 4,4'-(ethane-1,2-diyl)bis(2,6-dimethylphenol).

15. The multi-coat coating system according to claim 1, wherein the multi-coat coating system is substantially free of polyhydric phenols having estrogenic activity greater than or equal to that of 4,4',4"(ethane-1,1,1-triyl)triphenol.

16. The multi-coat coating system according to claim 1, wherein the polymer is derived from reactants including a polyhydric phenol and a non-bisphenol diepoxide.

17. The multi-coat coating system according to claim 16, wherein the non-bisphenol diepoxide comprises an aliphatic or cycloaliphatic diepoxide.

18. The multi-coat coating system according to claim 17, wherein the non-bisphenol diepoxide is at least one of 1,4-cyclohexanedimethanol diglycidyl ether, neopentyl glycol diglycidyl ether, 2-methy-1,3-propanediol diglycidyl ether, or tricyclodecane dimethanol diglycidyl ether.

19. The multi-coat coating system according to claim 16, wherein the polyhydric phenol is at least one of catechol, substituted catechol, hydroquinone, substituted hydroquinone, resorcinol, or substituted resorcinol.

20. The multi-coat coating system according to claim 1, wherein the overcoat comprises a thermoplastic material, and wherein the thermoplastic material comprises polyvinyl chloride, an organosol, or plastisol.

21. The multi-coat coating system according to claim 20, wherein the thermoplastic material is dispersed in a liquid carrier.

22. The multi-coat coating system according to claim 21, wherein the liquid carrier is non-aqueous.

23. The multi-coat coating system according to claim 1, wherein the overcoat comprises a polyester polymer.

24. The multi-coat coating system according to claim 1, wherein the overcoat comprises at least 30 present by weight of the polyester polymer or the thermoplastic material.

25. The multi-coat coating system according to claim 1, wherein the polymer constitutes at least 30 present by weight of the undercoat composition based on the total weight of resin solids in the undercoat composition.

26. An article comprising:
a container, or a portion thereof, comprising a metal substrate; and
a multi-coat coating system applied on at least a portion of the metal substrate, the multi-coat coating system comprising:
an undercoat composition comprising a polymer having two or more aryl or heteroaryl groups joined by a linking group having a molecular weight of about 125 Daltons to about 500 Daltons; and
an overcoat composition comprising at least one thermoplastic material or a polyester polymer,
wherein the polymer is derived from polyhydric phenols having a logarithmic Relative Proliferative Effect (RPE) of −2 or less.

27. The article according to claim 26, wherein the polymer of the undercoat composition comprising has one or more segments of the below Formula IA:

Formula IA

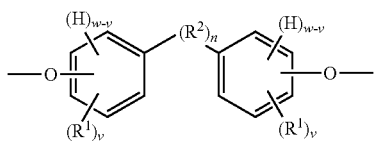

wherein:
- i. H denotes a hydrogen atom, if present;
- ii. each $R^1$ is independently an atom or group having an atomic weight of at least 15 Daltons;
- iii. v is independently 0 to 4;
- iv. w is 4;
- v. n is 1;
- vi. $R^2$ is the linking group having a molecular weight of about 125 Daltons to about 500 Daltons; and
- vii. two or more $R^1$ or $R^2$ groups can join to form one or more cyclic groups.

28. The article according to claim 26, wherein the container comprises a food or beverage container.

29. The article according to claim 28, wherein the undercoat is on a food-contact surface of the food or beverage container.

30. The article according to claim 26, wherein the container or a portion thereof comprises a closure for a food or beverage container, wherein the closure is an easy open closure with at least a portion of an interior surface of the easy open closure coated with the multi-coat coating system.

31. The article according to claim 26, wherein the container or a portion thereof comprises a closure for a food or beverage container, wherein the closure is twist off closure with at least a portion of an interior surface of the twist off closure coated with the multi-coat coating system.

32. A method comprising:
- applying an undercoat composition on at least a portion of a metal substrate prior to or after forming the metal substrate into a container;
- drying or at least partially curing the undercoat composition; and
- applying and curing an overcoat composition on the undercoat composition to produce a cured multi-coat coating adhered to the metal substrate,
- wherein the undercoat composition comprises a polymer having two or more aryl or heteroaryl groups joined by a linking group having a molecular weight of about 125 Daltons to about 500 Daltons,
- wherein the overcoat composition comprises at least one thermoplastic material or a polyester polymer, and
- wherein the polymer is derived from polyhydric phenols having a logarithmic Relative Proliferative Effect (RPE) of −2 or less.

\* \* \* \* \*